(12) United States Patent
Chao et al.

(10) Patent No.: US 10,887,608 B2
(45) Date of Patent: Jan. 5, 2021

(54) METHODS AND APPARATUSES FOR ENCODING AND DECODING DIGITAL LIGHT FIELD IMAGES

(71) Applicant: SISVEL TECHNOLOGY S.R.L., None (IT)

(72) Inventors: Yung-Hsuan Chao, Tokyo (JP); Gene Cheung, Tokyo (JP); Antonio Ortega, Los Angeles, CA (US)

(73) Assignee: Sisvel Technology S.R.L., None (IT)

( * ) Notice: Subject to any disclaimer, the term of this patent is extended or adjusted under 35 U.S.C. 154(b) by 0 days.

(21) Appl. No.: 16/610,751

(22) PCT Filed: May 3, 2018

(86) PCT No.: PCT/IB2018/053070
§ 371 (c)(1),
(2) Date: Nov. 4, 2019

(87) PCT Pub. No.: WO2018/207059
PCT Pub. Date: Nov. 15, 2018

(65) Prior Publication Data
US 2020/0077100 A1 Mar. 5, 2020

(30) Foreign Application Priority Data
May 10, 2017 (IT) .................... 102017000050848

(51) Int. Cl.
*H04N 19/46* (2014.01)
*H04N 19/176* (2014.01)
(Continued)

(52) U.S. Cl.
CPC ......... *H04N 19/176* (2014.11); *H04N 13/161* (2018.05); *H04N 13/229* (2018.05);
(Continued)

(58) Field of Classification Search
CPC .. H04N 19/176; H04N 19/117; H04N 19/182; H04N 19/46; H04N 13/229;
(Continued)

(56) References Cited

U.S. PATENT DOCUMENTS

| | | | |
|---|---|---|---|
| 7,920,200 B2 * | 4/2011 | Azuma ................ | H04N 5/3572 348/335 |
| 2008/0152215 A1 * | 6/2008 | Horie ................... | H04N 19/597 382/154 |

(Continued)

OTHER PUBLICATIONS

International Search Report dated Aug. 16, 2018, issued in PCT Application No. PCT/IB2018/053070, filed May 3, 2019.

(Continued)

*Primary Examiner* — Tung T Vo
(74) *Attorney, Agent, or Firm* — Workman Nydegger

(57) ABSTRACT

A method for encoding a raw lenselet image includes a receiving phase, wherein at least a portion of a raw lenselet image is received, the image including a plurality of macro-pixels, each macro-pixel having pixels corresponding to a specific view angle for the same point of a scene, and an output phase, wherein a bitstream having at least a portion of an encoded lenselet image is outputted. The method has an image transform phase, wherein the pixels of said raw lenselet image are spatially displaced in a transformed multi-color image having a larger number of columns and rows with respect to the received raw lenselet image, wherein dummy pixels having undefined value are inserted into the raw lenselet image and wherein the displacement is performed so as to put the estimated center location of each macro-pixel onto integer pixel locations. Moreover, the method includes a sub-view generation phase, wherein a sequence of sub-views is generated, said sub-views having pixels of the same angular coordinates extracted from different macro-pixels of the transformed raw lenselet image.

(Continued)

Finally, the method has a graph coding phase, wherein a bitstream is generated by encoding a graph representation of at least one of the sub-views of the sequence according to a predefined graph signal processing technique.

19 Claims, 16 Drawing Sheets

(51) Int. Cl.
*H04N 19/117* (2014.01)
*H04N 19/182* (2014.01)
*H04N 13/229* (2018.01)
*H04N 13/232* (2018.01)
*H04N 13/161* (2018.01)

(52) U.S. Cl.
CPC ......... *H04N 13/232* (2018.05); *H04N 19/117* (2014.11); *H04N 19/182* (2014.11); *H04N 19/46* (2014.11)

(58) Field of Classification Search
CPC .. H04N 13/232; H04N 13/161; H04N 19/597; H04N 19/10; H04N 19/649; H04N 19/88
USPC ...................................... 375/240.13
See application file for complete search history.

(56) References Cited

U.S. PATENT DOCUMENTS

| | | | | |
|---|---|---|---|---|
| 2009/0290645 A1* | 11/2009 | Mabey | ................... | H04N 19/12 375/240.25 |
| 2015/0319456 A1* | 11/2015 | Le Floch | ............. | H04N 19/119 375/240.12 |
| 2016/0037152 A1* | 2/2016 | Kim | ........................ | G06T 7/557 348/47 |
| 2016/0241855 A1* | 8/2016 | Le Floch | ............. | H04N 19/172 |
| 2016/0307368 A1* | 10/2016 | Akeley | ..................... | G06T 9/00 |
| 2018/0342075 A1* | 11/2018 | Wang | ................... | H04N 13/232 |
| 2019/0124360 A1* | 4/2019 | Vandame | ............. | H04N 19/597 |
| 2019/0197714 A1* | 6/2019 | Pau | ................... | H01L 27/14623 |

OTHER PUBLICATIONS

Written Opinion dated Aug. 16, 2018, issued in PCT Application No. PCT/IB2018/053070, filed May 3, 2019.
Caroline Conti et al., *Improved Spatial Prediction for 3D Holoscopic Image and Video Coding*, 19th IEEE European Signal Processing Conference 2011, pp. 379-382.
Wei. Hu, et al., *Multiresolution Graph Fourier Transform for Compression of Piecewise Smooth Images*, IEEE Transactions on Image Processing, vol. 23, No. 1, Jan. 2015, pp. 419-433.
Yung-Husan Chao et al., *Graph-Based Lifting Transform for Intra-Predicted Video Coding*, 2016 IEEE International Conference on Acoustics, Speech and Signal Processing (ICASSP 2016), pp. 1140-1144.
Donald. G. Dansereau et al., *Decoding, Calibration and Rectification for Lenselet-Based Plenoptic Cameras*, Proceedings of the IEEE Conference on Computer Vision and Pattern Recognition (2013), pp. 9.
C. Perra et al., *High Efficiency Coding of Light Field Images Based on Tiling and Pseudo-Temporal Data Arrangement*, IEEE Multimedia & Expo Workshops (ICMEW 2016), pp. 4.
Feng Dai et al., Lenselet Image Compression Scheme Based on Subaperture Images Streaming, University of Chinese Academy of Sciences, Beijing, China, 2015 IEEE, pp. 4733-4737.
M. Rerabek et al., *New Light Field Image Dataset*, 8th International Conference on Quality of Multimedia Experience (QoMEX), No. EPFL-CONF-218363, 2016, pp. 2.
Amir Said et al., *A New, Fast, and Efficient Image Codec Based on Set Partitioning in Hierarchical Trees*, IEEE Transactions on Circuits and Systems for Video Technology, vol. 6, No. 3, 1996, pp. 243-250.
Eduardo Martinez-Enriguez, et al., *Lifting Transforms on Graphs for Video Coding*, 2011 Data Compression Conference, 2011, IEEE, pp. 73-82.

* cited by examiner (a)

(b)

(a)

(b)

(a)

(b)

METHODS AND APPARATUSES FOR ENCODING AND DECODING DIGITAL LIGHT FIELD IMAGES

FIELD OF THE INVENTION

The present invention relates to a method and an apparatus for encoding and/or decoding digital images; in particular, for coding and/or decoding digital images provided by the so-called light field cameras.

DESCRIPTION OF THE PRIOR ART

During operation, a conventional digital camera captures a two-dimensional (2D) image representing a total amount of light that strikes each point on a photo-sensor within the camera. However, this 2D image contains no information about the directional distribution of the light that strikes the photo-sensor.

In contrast, light field cameras sample the four-dimensional (4D) optical phase space or light field and in doing so capture information about the directional distribution of the light rays. Directional information at the pixels corresponds to locational information at the aperture.

This information captured by light field cameras may be referred to as the light field, the plenoptic function, or radiance.

In computational photography, a light field is a 4D record of all light rays in 3D. Radiance describes both spatial and angular information, and is defined as density of energy per unit of area per unit of stereo angle (in radians).

A light field camera captures radiance, therefore enables different post-processing, such as: re-focusing, noise reduction, 3D view construction and modification of depth of field, furthermore has wide applications including 3D TV and medical imaging.

Light fields may be captured with a conventional camera. In one conventional method, M×N images of a scene are captured from different positions with a conventional camera. If, for example, 8×8 images are captured from 64 different positions, 64 images are produced. The pixel from each position (i, j) in each image are taken and placed into blocks, to generate 64 blocks.

FIG. 1(a) illustrates an exemplary prior art light field camera 100, or camera array, which employs an array of two or more objective lenses 110. Each objective lens focuses on a particular region of photosensor 140. This light field camera 100 may be viewed as a combination of two or more conventional cameras that each simultaneously records an image of a subject on a particular region of photosensor 140. The captured images may then be combined to form one image.

FIG. 1(b) illustrates an exemplary prior art plenoptic camera 150, another type of light field camera, that employs a single main objective lens 160 and a microlens or lenselet array 170 that includes, for example, about 100,000 lenselets.

Lenselet array 170 is typically placed at a small distance (~0.5 mm) from a photosensor 180, which can be for example a charge-coupled device (CCD). Through the microlens array 170, each point of the 3D scene is projected onto a group of pixels, called macro-pixel, instead of a single pixel as in the traditional 2D images. Each pixel within a macro-pixel corresponds to a specific view angle for the same point of the scene.

FIG. 2 shows an example of image captured by plenoptic camera 150, also called lenselet image (FIG. 2(a)), which is made up of an array of macro-pixels (FIG. 2(b)) that are typically hexagonal or circular shaped (FIG. 2(c)). The lenselet array 170 enables the plenoptic camera 150 to capture the light field, i.e. to record not only the image intensity, but also the distribution of intensity in different directions at each point.

Each lenselet splits a beam coming to it from the main lens 160 into rays coming from different "pinhole" locations on the aperture of the main objective lens 160.

The plenoptic photograph captured by a camera 150 with, for example, 100,000 lenselets, will contain 100,000 macropixels. Captured light fields from light field cameras including plenoptic cameras are commonly saved as a lenselet image (FIG. 2(a)).

Compression of light field images is an important problem for computational photography. Due to the 4D nature of light fields, and the fact that 2D slices of light fields are equivalent to conventional pictures, the uncompressed files tend to be big, and may take up to gigabytes of space.

At the same time, there is redundancy in the data: all rays starting from a surface point have approximately the same radiance.

Thus, there is motivation for compression of light field images. Conventionally, light field images have been compressed using existing lossy and lossless image/video compression techniques.

Some conventional image compression approaches treat the 2D slices in a light field image as separate images and compress each separately. In others, the 4D light field image is contained in one 2D image, which is simply compressed by conventional methods as one image.

These approaches do not utilize the information and redundancy specific to light field images, but rather treat them as general images.

JPEG (Joint Photographic Experts Group) is a common conventional image compression standard, which employs block-based compression techniques. JPEG divides images into 8×8 pixel blocks, or more generally block-based compression techniques divide images into m×n pixel blocks, and compresses these blocks using some transform function. Because of the division of images into blocks, JPEG and other block-based compression techniques are known to have the problem of generating "blocking artifacts", in which the compressed image appears to be composed of blocks or has other introduced vertical/horizontal artifacts (e.g., vertical or horizontal lines, discontinuities, or streaks). The JPEG standard and other block-based compression techniques may be used to compress light field images directly, without consideration for the specifics of light field data.

However, due to the quasi-periodic nature of light field images, and the blocky nature of the compression, the results tend to be poor, including noticeable blocking artifacts. Such blocking artifacts may severely damage the angular information in the light field image, and therefore may limit the horizontal and vertical parallax that can be achieved using these images.

Several approaches have been proposed to compress specifically the light field images as a frame in a video, by employing video coding standards such as AVC (Advanced Video Codec) or HEVC (High Efficiency Video Coding).

These standards have been developed by the Moving Picture Experts Group (MPEG) and by the Joint Collaborative Team on Video Coding (JCT-VC), and adopt a block based coding approach employing Discrete Cosine Transform (DCT) techniques.

In light field image processing, a lenselet image is usually converted into the so called subaperture images, which is shown in FIG. 3(a).

A subaperture image consists of multiple sub-views, where each of them consists of pixels of the same angular coordinates, extracted from different macro-pixels in the lenselet image.

In FIG. 3(a), the sub-views are arranged according to the relative location within a macro-pixel. In a subaperture image there are in general two types of redundancies that can be exploited for compression, namely the intra-view and inter-view correlation.

The first redundancy type is the spatial correlation within each view, similar to the regular 2D image, where nearby pixels tend to have similar pixel intensities.

The second redundancy type is the inter-view correlation between the neighbouring sub-views. In the literature of light field data compression, these two correlation types have been exploited in the similar way as intra-prediction and inter-prediction in the video coding standard such as AVC and HEVC.

In general, the methods can be classified into two categories.

The first one compresses the subaperture image with modified intra-prediction in the current video codec. Conti et al. in "*Improved spatial prediction for 3d holoscopic image and video coding*", published in 19$^{th}$ *IEEE European Signal Processing Conference* 2011, propose an extra self-similarity (SS) mode and a SS skip mode, which are included in the current intra-prediction modes to exploit the correlation between neighbouring sub-views in the subaperture image.

In the second approach, sub-views in a subaperture image are rearranged into a pseudo-video sequence, which is then encoded using existing video coding standards like HEVC. Works in which different sub-image re-arrangement schemes are applied. Perra and Assuncao in "i High efficiency coding of light field images based on tiling and pseudo-*temporal data arrangement*", published in *IEEE Multimedia & Expo Workshops* (*ICMEW* 2016), present a light field coding scheme based on a low-complexity pre-processing approach that generates a pseudo-video sequence suitable for standard compression using HEVC.

However, the aforementioned existing works require pre-processing stages which increase data representation redundancy prior to compression.

In order to show the limitation of the current state of art about the compression of light field images as a frame in a video, the architecture of a light field image encoding-decoding system is illustrated in FIG. 4 in terms of its basic functional units.

The encoder 400 includes at least a light field image pre-processing unit 420, a subaperture image processing unit 430 and a block based encoder unit 440.

The light field image pre-processing unit 420 takes as input the patterned raw lenselet image f, which is generated by a photosensor 410 (e.g. CDD sensor).

The patterned raw lenselet image f is a multi-color image, i.e. an image comprising information about different colours (e.g. red, green, blue) which can be generated by employing a color filter array on a square grid of photosensors such as the well-known Bayer filter. FIG. 5(a) and FIG. 6(a) schematically show an example of said color filter array (element f).

The particular arrangement of color filters is used in most single-chip digital image sensors used in digital cameras, camcorders, and scanners in order to create a color image.

With reference to FIG. 5, the pre-processing unit 420, first generates the full-color lenselet image through a RGB color interpolation which is known in the art as demosaicing technique, this operation increases the data volume to three times of the original raw data (FIG. 5(b)), because for each color channel R, G, B an image is generated which has the same size of the original raw image.

Successively, the conversion from the full-color lenselet to subaperture image is performed as described by D. G. Dansereau, O. Pizarro and S. B. Williams in "*Decoding, calibration and rectification for lenselet-based plenoptic cameras*", published in *Proceedings of the IEEE Conference on Computer Vision and Pattern Recognition* (2013). During the conversion, the demosaiced lenselet images are first rotated, translated and scaled so that the estimated locations of the center of the macro-pixel, denoted in dashed line (FIG. 5(c)), can fall onto the integer pixel locations. This operations resulting in 20% increase of pixel amount. Finally, the subaperture image f' is generated from the converted lenselet image based on the relative position of each pixel to the macro-pixel center.

The subaperture image processing unit 430 takes as input the subaperture image f', and arranges the sub-views images, which compose f', into a sequence.

The sequence of the sub-views can obey to various criteria, for example the sequence can be composed in terms of group of pictures, or GOP (Group Of Pictures) structure, specifying the order in which intra-frames and inter-frames are arranged.

The resulting sequence of sub-views f" is such that can be received from a block based encoder.

The block based encoder unit 440 takes as input the sub-views sequence and encodes it according to a well-known video coding standard such as AVC or HEVC.

Moreover, the methods used by said standards during the compression, require a conversion form 4:4:4-RGB format to 4:2:0-YUV format.

Although, the down-sampling of U and V components reduces the redundancy introduced by the demosaicing and scaling, however, the rounding effect during the color conversion may introduce other distortion. The output of the encoder unit 440 is a bitstream f^ compliant with said standards.

The encoder 400 then transmits the bitstream f^ to the receiver node over a bandwidth constrained channel or memorizes them on a memory support 450 for later use, e.g. for decoding purposes.

The decoder 460 includes, at least, a block based decoder unit 470 and a post-processing unit 480. For sake of simplicity, we assume that the bitstream f^ available to the decoders 460 is identical to that generated by the encoders 400, since in practical applications adequate measures are taken for minimizing read/write or channel errors occurring during information transfer from the encoder to the decoder.

The block based decoder unit 470, takes as input the bitstream f^, and generates the reconstructed sub-views sequence f''' according to the appropriate video coding standard (AVC, HEVC, etc.).

The post-processing unit 480, takes as input the reconstructed sub-views sequence f''' and generates a reconstructed light field image f^, using techniques which enables operation such as image re-focusing, noise reduction, 3D view construction and modification of depth of field, as mentioned above.

Finally, the reconstructed light field image f^ is displayed using the display unit 490 such as TV-sets, monitors, etc.

In real world applications, the communication takes place over a bandwidth constrained channels, it is hence desirable that light field images can undergo some effective form of compression prior they are put on the channel. The same applies to the memorization of the light field images on a storage unit having limited capacity.

Regarding the problem of compressing light field images, some pre-processing stages increase data representation redundancy prior to compression. In a light field camera, which uses CCD plate at the photo sensor in capturing the color information, each pixel location only contains intensity of single color component (R, G, or B).

However, the existing compression technique all require full colored subaperture images as input.

Therefore, demosaicing is required to produce the full color lenselet images from CCD patterned image, which increases the data volume to three times of the original raw data; another redundancy is introduced during the conversion from lenselet to subaperture image.

During the conversion, the demosaiced lenselet images are rotated, translated and scaled so that the estimated locations of macro-pixels center can fall onto the integer pixel locations, resulting in 20% increase of pixel amount.

Moreover, for methods using compression standard, e.g. AVC and HEVC, the 4:4:4-RGB subaperture images need to be converted into 4:2:0-YUV images. Although, the downsampling of U and V components reduces the redundancy introduced by the demosaicing and scaling, the rounding effect during the color conversion may introduce other distortion.

SUMMARY OF THE INVENTION

The present invention aims to solve these and other problems by providing a method and an apparatus for encoding and/or decoding digital images provided by light field cameras. The basic idea of the present invention is to generate a new compact light field image data representation that avoids redundancy due to demosaicing and scaling; the new representation is efficiently compressed using graph signal processing (GSP) techniques. Conversely, in the decoding stage inverse GSP techniques are performed.

More in detail, at the encoding stage, in order to put the estimated center location of each macro-pixel onto integer pixel locations, the pixels of the raw light field image are spatially displaced in a new, transformed multi-color image, having a larger number of columns and rows with respect to the received raw image. Such displacement introduces dummy pixels, i.e. pixel locations having undefined values. A sequence of sub-views is then obtained, and a bitstream ($f_d\hat{}$) is generated by encoding a graph representation of the sub-view images.

At the decoding side, the bitstream ($f_d\hat{}$) is graph decoded in a process reversing the GSP technique applied at the encoder side, a reconstructed sub-views sequence ($f_d''$) is obtained from the result of the graph decoding. The subviews of the sequence comprise the dummy pixels introduced at the encoding side for centering the macro-pixels onto integer pixel locations. Then a demosaicing filter is applied to said sub-view sequence, obtaining a demosaiced full-color lenselet image, from which a full-color subaperture image ($f_d'''$) is obtained.

The method disclosed in the present invention can be applied on the original color domain directly, e.g. the RGB color domain, without performing color conversion and rounding during encoding, which typically results in errors.

BRIEF DESCRIPTION OF DRAWING

The characteristics and other advantages of the present invention will become apparent from the description of an embodiment illustrated in the appended drawings, provided purely by way of no limiting example, in which.

DETAILED DESCRIPTION OF THE INVENTION

In this description, any reference to "an embodiment" will indicate that a particular configuration, structure or feature described in regard to the implementation of the invention is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate.

The references below are therefore used only for sake of simplicity, and do not limit the protection scope or extension of the various embodiments.

Figure 10:
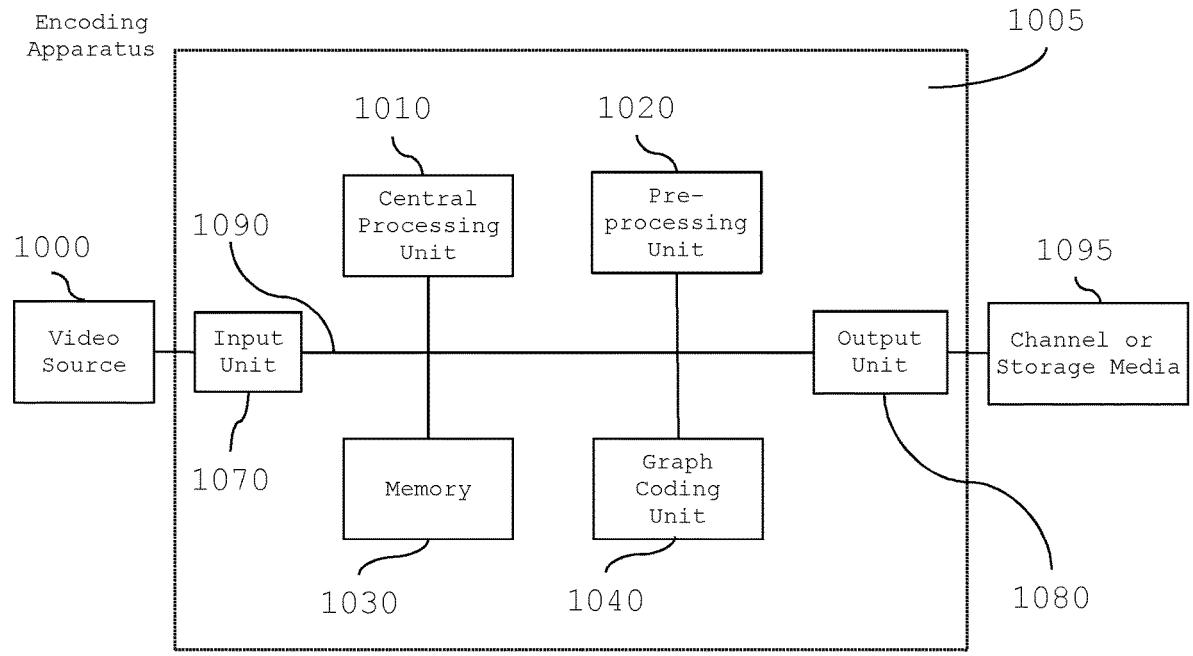
FIG. 10 shows a block diagram illustrating apparatuses for compressing digital light field image or video streams according to an embodiment of the present invention.

With reference to FIG. 10, an apparatus 1005 for compressing digital images or video streams (also named encoding apparatus 1005) comprises the following parts:

- a processing unit 1010, like a Central Processing Unit (CPU), configured for executing a set of instructions for carrying out a method for encoding digital images or video streams according to the invention (said method will be described in details in the following of present description);
- a memory unit 1030 of any kind (volatile or non volatile, removable or fixed) and technology (e.g. electronic, semiconductor-based or opto-electronic) containing data relating to the image to be compressed and preferably the instructions that implement the method for encoding digital images or video streams according to the invention, wherein the image data are a representation of at least a portion of said image and are preferably in binary format, and wherein said memory unit 1140 may also contain the result of the execution of instructions of said method;
- an input unit 1070 (e.g. I/O means), which can be configured by the CPU 1010 to read from a (video) source 1000 light field images or video streams to be processed; such input unit may for example include an adapter according to at least one of the following standards: USB, Firewire, RS232, IEEE 1284, Ethernet, Wi-Fi, or the like;
- a pre-processing unit 1020, which is configured for executing the phases of the method for generating a graph representation of a sequence of sub-views $f_d'$ starting from a raw lenselet image f, which is generated by a light field image or video source 1000. In particular, this unit is configured for receiving the raw lenselet image from the source 1000, then transform it in order to put the estimated center location of each macro-pixel (composing the raw lenselet image) onto the integer pixel locations. Next, starting from the transformed raw lenselet image a subaperture image 670 is generated and then a sequence of sub-views (composing the subaperture image) is arranged on the basis of at least one predefined order, like a raster scan order, a helicoidal order, a zig-zag order, a chess-like order, and so on. Important is that the same order is used also in the decoding apparatus 1100. Finally, the sequence of sub-views is divided in terms of group of pictures GOPs from which a graph representation of the sequence of sub-views $f_d'$ is obtained.
- a graph coding unit 1040, which is configured for fetching the graph representation of the sequence of sub-views $f_d'$ from the memory unit 1030, executing the phases of the method for encoding digital images or video streams according to a graph signal processing (GSP) technique such as the Graph Fourier transform (GFT) or the Graph based Lifting Transform (GLT) for coding each GOP separately, and storing the resulting bitstream $f_d\hat{}$ back into the memory unit 1030;
- output unit 1080 (e.g. a network or storage adapter), which can be configured by the CPU 1010 to transmit, through a communication channel, the processing result to a destination 1095 (e.g. a storage media, a remote client or the like); such output unit may for example include an adapter according to at least one of the following standards: Ethernet, SATA, SCSI, or the like;
- a communication bus 1090, which allows the exchange of information between the CPU 1010, the pre-processing unit 1020, the memory unit 1030, the graph coding unit 1040, the input unit 1070, and the output unit 1080. As an alternative to using the communication bus 1090, the CPU 1010, the pre-processing unit 1020, the memory unit 1030, the graph coding unit 1040, the input unit 1070, and the output unit 1080 can be connected by means of a star architecture.

The video source 1000 can be either a provider of live images, such as a light field camera, or a provider of stored contents such as a disk or other storage and memorization devices. The Central Processing Unit (CPU) 1010 takes care of activating the proper sequence of operations performed by the units 1020, 1040, in the encoding process performed by the apparatus 1005.

These units can be implemented by means of dedicated hardware components (e.g. CPLD, FPGA, or the like) or can be implemented through one or more sets of instructions which are executed by the CPU 1010; in the latter case, the units 1020, 1040 are just logical (virtual) units.

When the apparatus 1005 is in an operating condition, the CPU 1010 first fetches the light field image f from the video source 1000 and loads it into the memory unit 1030.

Next, the CPU 1010 activates the pre-processing unit 1020, which fetches the raw lenselet image f from the memory 1030, executes the phases of the method for pre-process the raw lenselet image f according to an embodiment of the invention (see FIG. 7), and stores the resulting graph representation of the sequence of sub-views $f_d'$ back into the memory unit 1030.

Successively, the CPU 1010 activates the graph coding unit 1040, which fetches from the memory 1030 the graph representation of the sequence of sub-views $f_d'$, executes the phases of the method for encode the sequence of sub-views $f_d'$ according to a graph signal processing (GSP) techniques such as the Graph Fourier transform (GFT) or the Graph based Lifting Transform (GLT), and stores the resulting bitstream $f_d\hat{}$ back into the memory unit 1030.

At this point, the CPU 1010 may dispose of the data from the memory unit 1030 which are not required anymore at the encoder 1005.

Finally, the CPU 1010 fetches the bitstream $f_d\hat{}$ from memory 1030 and puts it into the channel or saves it into the storage media 1195.

Figure 8:
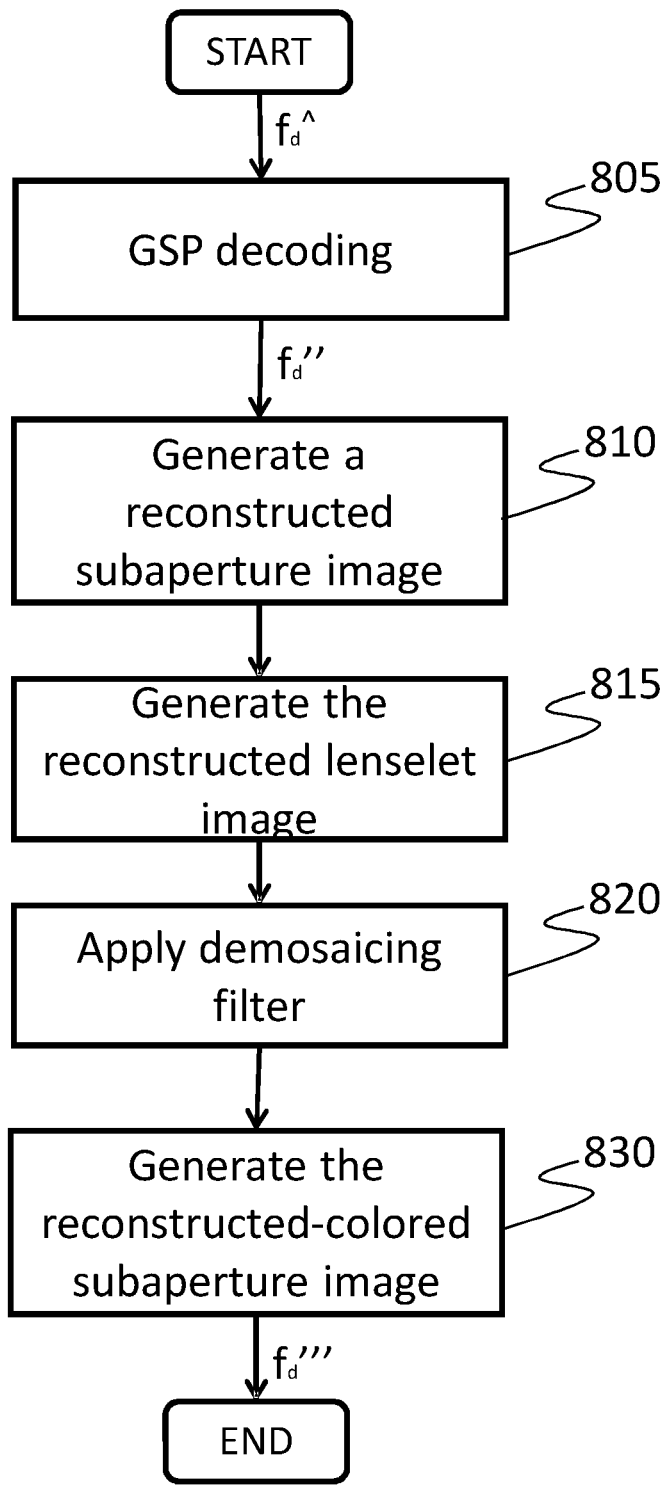
FIG. 8 shows the functioning of the demosaicing stage for decoding digital light field images according to an embodiment of the present invention.
Figure 11:
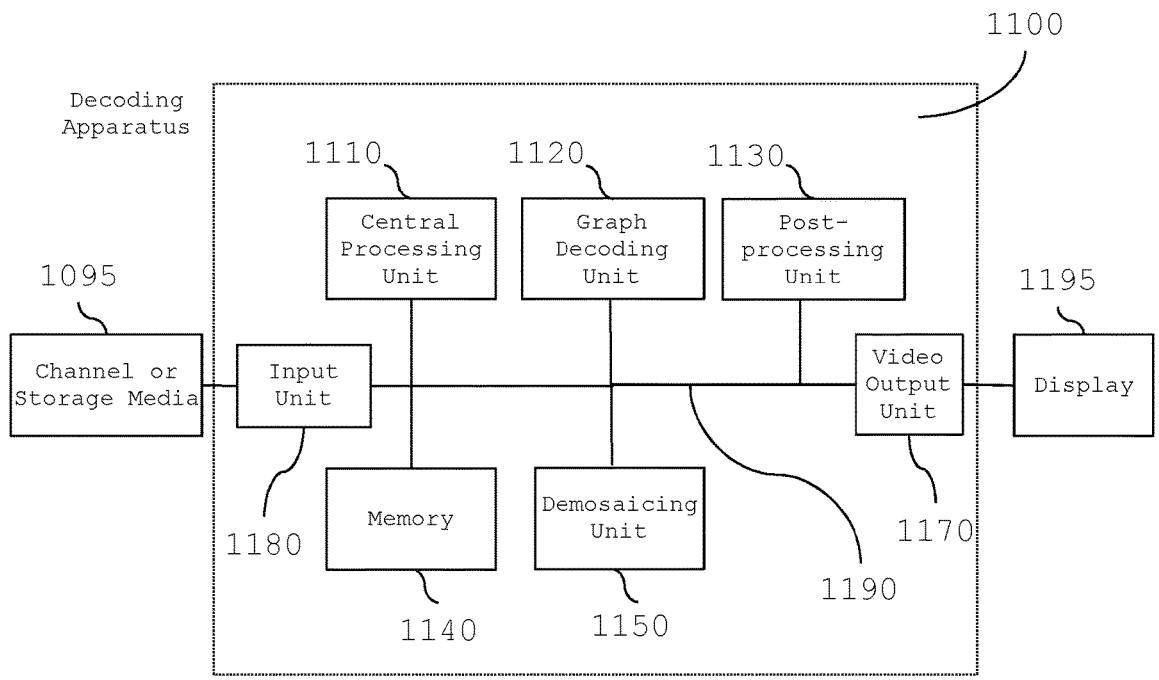
FIG. 11 shows a block diagram illustrating apparatuses for decompressing digital light field image or video streams according to an embodiment of the present invention.
Figure 18:
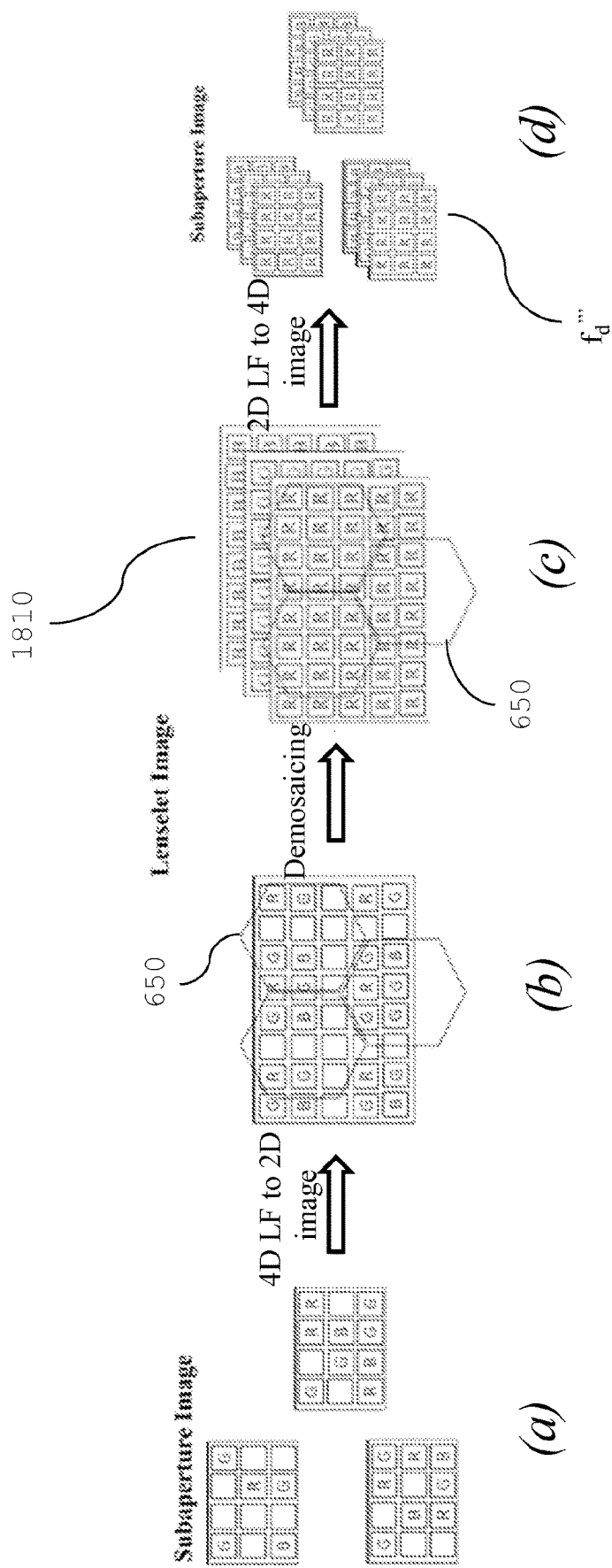
FIG. 18 illustrates the operations for decoding light field images according to an embodiment of the present invention.

With reference also to FIG. 11, an apparatus 1100 for decompressing digital images or video streams (also named decoding apparatus 1100) comprises the following parts:

- a processing unit 1110, like a Central Processing Unit (CPU), configured for executing a set of instruction for carrying out a method for decoding digital images or video streams according to the invention (said method will be described in details in the following of present description);
- a memory unit 1140 of any kind (volatile or non volatile, removable or fixed) and technology (e.g. electronic, semiconductor-based or opto-electronic) containing data relating to the compressed image received and preferably the instructions that implement the method for decompressing digital images or video streams according to the invention, wherein the image data are a representation of at least a portion of said image and are preferably in binary format, and wherein said memory unit 1240 may also contain the result of the execution of instructions of said method;

an input unit 1180 (e.g. a network or storage adapter), which can be can be configured by the CPU 1110 to read the encoded images or video streams from a communication channel or storage media 1095; said input unit 1180 may for example comprise an adapter according to at least one of the following standards: Ethernet, SATA, SCSI, or the like;

a graph decoding unit 1120, which is configured for executing the phases of the method for decompressing digital light field images or video streams according to the invention; in particular, this unit is configured for receiving and decoding the bitstream $f_d\hat{}$ of the sub-views sequence according to a predefined graph signal processing (GSP) technique, such that the reconstructed sub-views sequence $f_d''$ is recovered;

a demosaicing unit 1150 which is configured for executing the phases of the method for receiving the reconstructed sub-views sequence $f_d''$ and generate a full-color subaperture image $f_d'''$ according to an embodiment of the invention (see FIG. 8 and FIG. 18). In particular, starting from the reconstructed sub-views sequence $f_d''$ a reconstructed subaperture image is obtained by re-arranging the reconstructed sub-views sequences according to at least one predefined order, then a reconstructed lenslet image is generated by locating the pixels of each sub-view into the corresponding macro-pixels 650 on the basis of their order. Successively, a demosaicing technique is applied to the reconstructed lenslet image in order to generate the full-color lenslet image through a RGB color interpolation. Finally, starting from the transformed full-color lenslet image, a full-color subaperture image $f_d'''$ is generated such that each sub-view comprising said full-color subaperture image $f_d'''$ is composed by considering the same relative pixel position with respect to each macro-pixel center;

a post-processing unit 1130 which is configured for receiving the full-color subaperture image $f_d'''$ and for generating a reconstructed light field image $f_d\tilde{}$. In particular, by using techniques which enables operation such as image re-focusing, noise reduction, 3D view construction and modification of depth of field;

an output video unit 1170, like a video adapter, which can be configured by the CPU 1110 to reproduce and/or output, preferably on a display 1195, the processed (decoded or decompressed) light field images or video streams; said output video unit may for example include an adapter according to at least one of the following standards: VGA, S-video, HDMI, Ethernet or the like;

a communication bus 1190, which allows the exchange of information between the CPU 1110, the graph decoding unit 1120, the demosaicing unit 1150, the memory unit 1140, the output video unit 1170, and the input unit 1180. As an alternative to using the communication bus 1190, the CPU 1110, the graph decoding unit 1120, the demosaicing unit 1150, the memory unit 1140, the output video unit 1170, and the input unit 1180 can be connected by means of a star architecture.

As for the previously described encoding apparatus 1005, also the CPU 1110 of the decoding apparatus 1100 takes care of activating the proper sequence of operations performed by the units 1120, 1130 and 1150.

These units can be implemented by means of dedicated hardware components (e.g. CPLD, FPGA, or the like) or can be implemented through one or more sets of instructions stored in a memory unit which are executed by the CPU 1110; in the latter case, the units 1120, 1130 and 1150 are just a logical (virtual) units.

When the apparatus 1100 is in an operating condition, the CPU 1110 first fetches the bitstream $f_d\hat{}$ from the channel or storage media 1095 via any possible input unit and loads it into the memory unit 1140.

Then, the CPU 1110 activates the graph decoding unit 1120, which fetches from the memory 1140 the bitstream $f_d\hat{}$, executes phases of the method for decoding the bitstream $f_d\hat{}$ of the sub-views sequence according to a predefined graph signal processing (GSP) technique, such as the Graph Fourier transform (GFT) or the Graph based Lifting Transform (GLT), outputs the reconstructed sub-views sequence $f_d''$, and loads it into the memory unit 1140.

Any GSP technique can be used according to the invention; important is that the same technique is used in the encoding and decoding apparatus 1100 for assuring a correct reconstruction of the original light field image.

Successively, the CPU 1110 activates the demosaicing unit 1150, which fetches from the memory 1140 the reconstructed sub-views sequence $f_d''$, and executes phases of the method for generating a full-color subaperture image $f_d'''$ according to the invention, and loads it into the memory unit 1140.

Then, the CPU 1110 activates the post-processing unit 1130, which fetches from the memory 1140 the full-color subaperture image $f_d'''$ and generates a reconstructed light field image $f_d\tilde{}$, storing it into the memory unit 1140.

At this point, the CPU 1110 may dispose of the data from the memory which are not required anymore at the decoder side.

Finally, the CPU 1110 fetches from memory 1140 the recovered light field image $f_d\tilde{}$ and sends it, by means of the video adapter 1170, to the display unit 1195.

It should be noted how the encoding and decoding apparatuses described in the figures may be controlled by the CPU 1110 to internally operate in a pipelined fashion, enabling to reduce the overall time required to process each image, i.e. by performing more instructions at the same time (e.g. using more than one CPU and/or CPU core).

It should also be noted than many other operations may be performed on the output data of the coding device 1005 before sending them on the channel or memorizing them on a storage unit, like modulation, channel coding (i.e. error protection).

Conversely, the same inverse operations may be performed on the input data of the decoding device 1100 before effectively process them, e.g. demodulation and error correction. Those operations are irrelevant for embodying the present invention and will be therefore omitted.

Besides, the block diagrams shown in FIG. 10 and FIG. 11 are of exemplificative nature only; they allow to understand how the inventions works and how it can be realized by the person skilled in the art.

The skilled person understands that these charts have no limitative meaning in the sense that functions, interrelations and signals shown therein can be arranged in many equivalents ways; for example, operations appearing to be performed by different logical blocks can be performed by any combination of hardware and software resources, being also the same resources for realizing different or all blocks.

The encoding process and the decoding process will now be described in detail.

Encoding

In order to show how the encoding process occurs, it is assumed that the image f (or a block thereof) to be processed is preferably a color patterned raw lenslet image, where each pixel is encoded over 8 bit so that the value of said pixel can be represented by means of an integer value ranging between 0 and 255. Of course, this is only an example; images of higher color depth (e.g. 16, 24, 30, 36 or 48 bit) can be processed by the invention without any loss of generality.

The image f can be obtained applying a color filter array on a square grid of photosensors (e.g. CDD sensors); a well-known color filter array is for example the Bayer filter, which is used in most single-chip digital image sensors.

Figure 12:
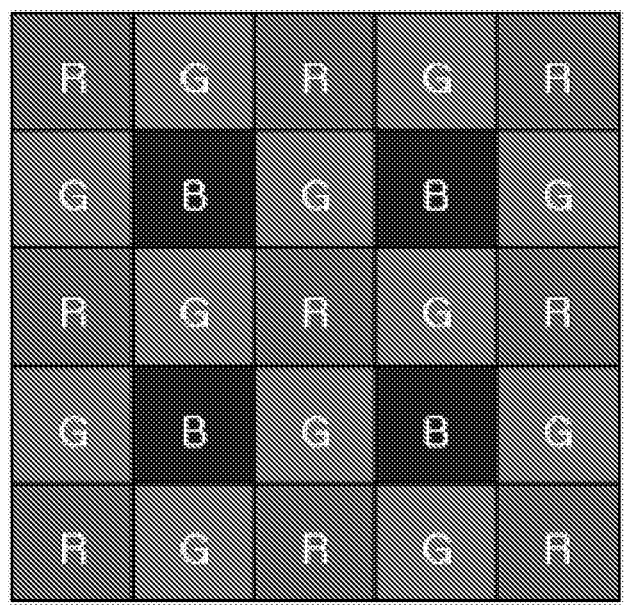
FIG. 12 shows two examples of color filter array.
Figure 12:
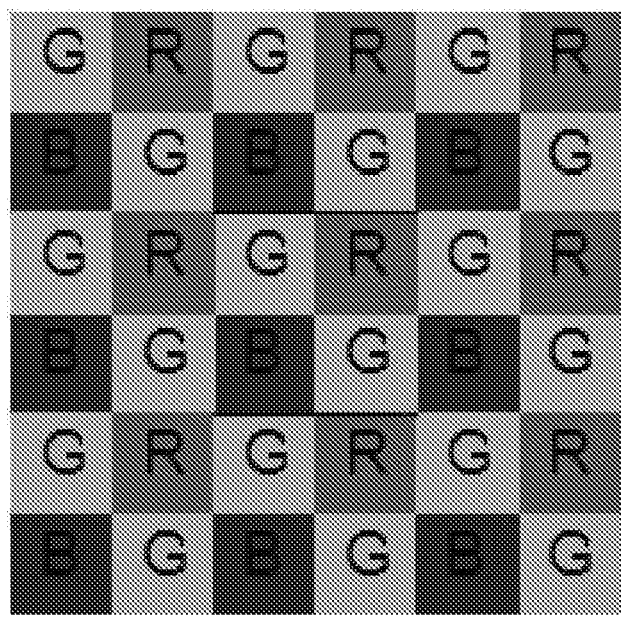

FIG. 12 shows some examples of color filter array, where the letters R,G,B indicate respectively the red, green and blue color filters which are applied on a grid of photosensors.

Figure 9:
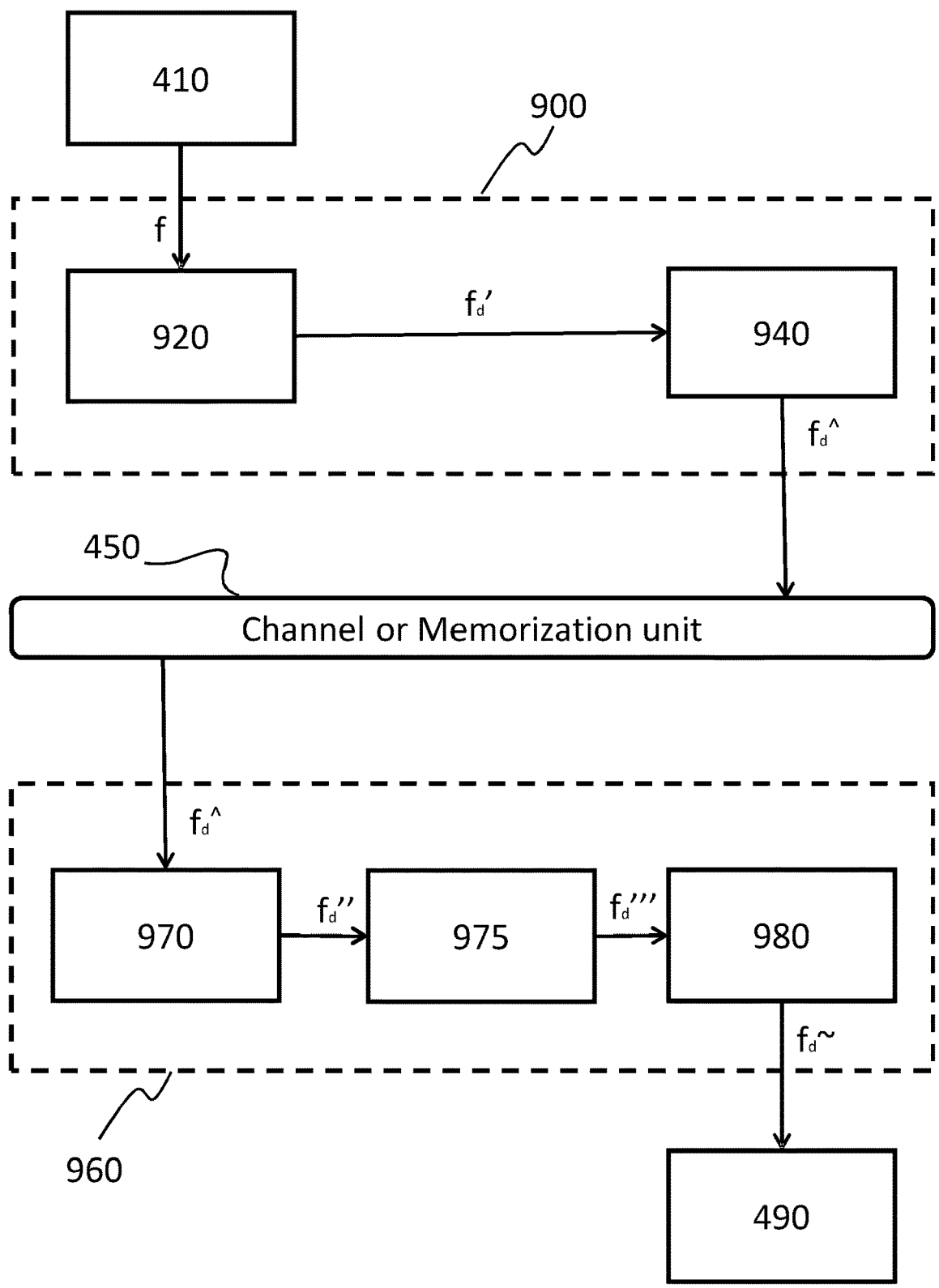
FIG. 9 illustrates a block diagram of light field image encoding-decoding system according to an embodiment of present invention.

With also reference to FIG. 9, it is now described how the different parts of the encoding apparatus 900 interact for compressing digital light field images or video streams.

Figure 1:
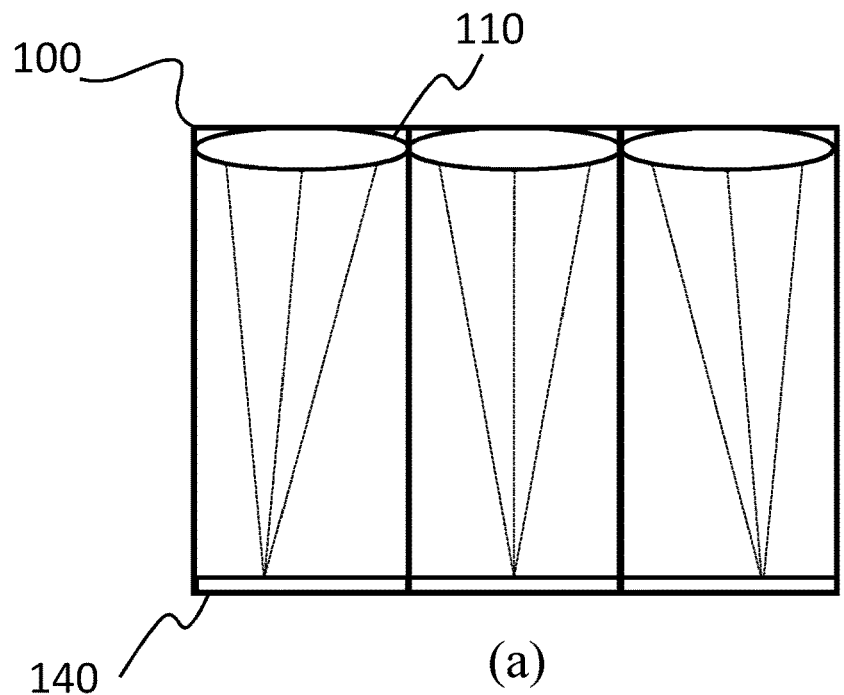
FIG. 1 illustrates an exemplary light field cameras 100 and an exemplary plenoptic camera 150.
Figure 1:
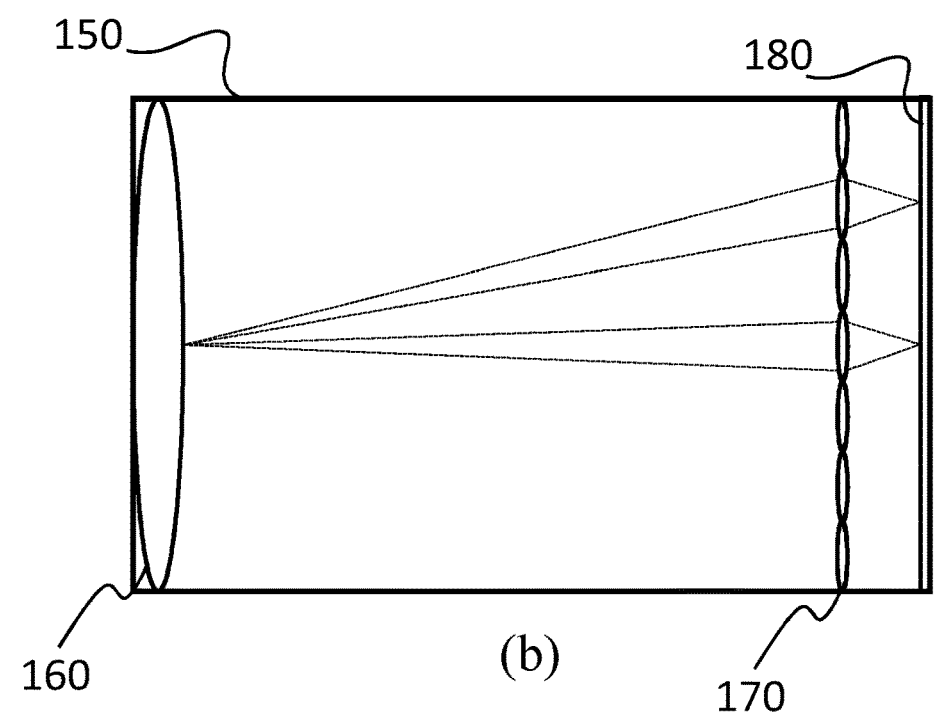
Figure 2:
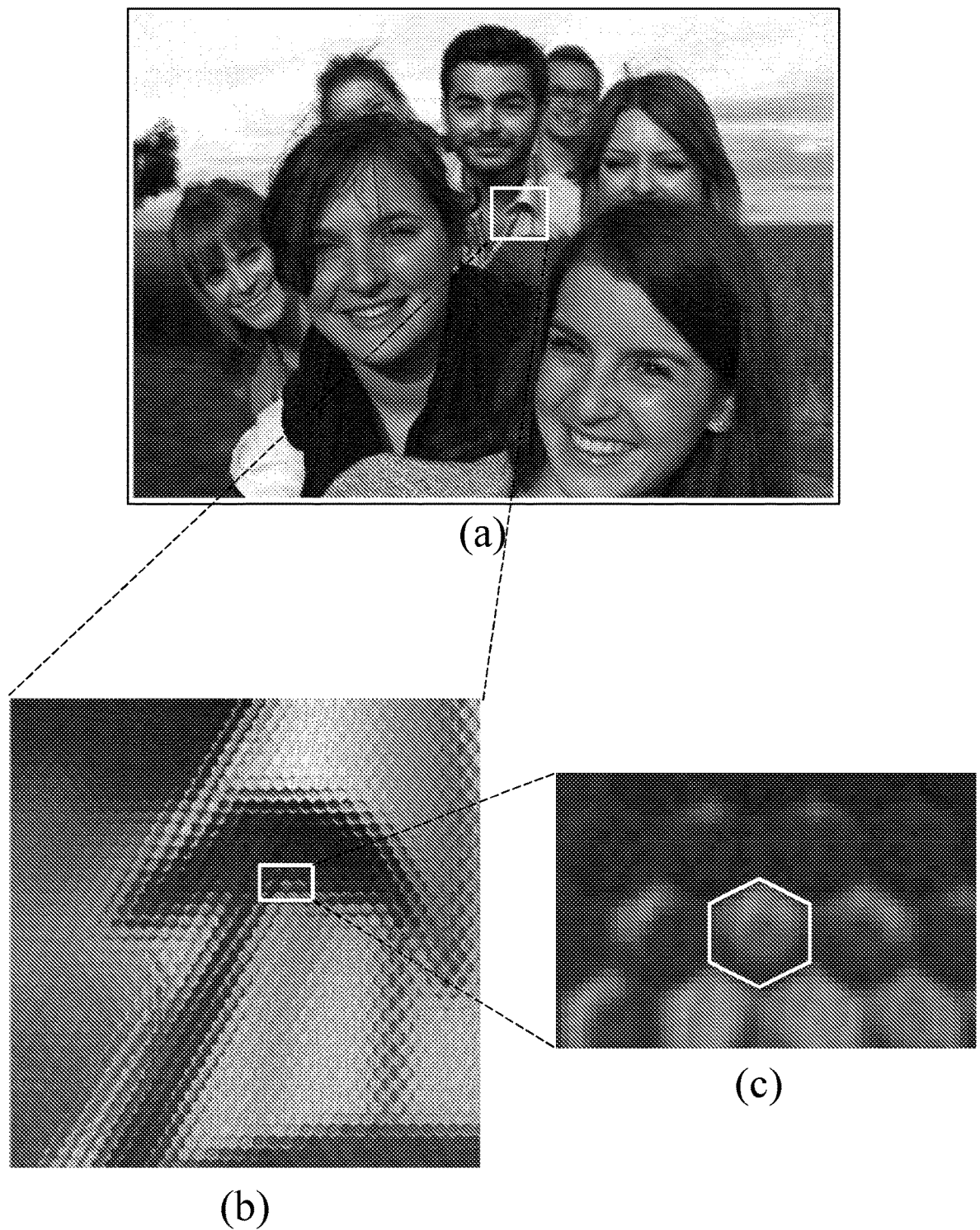
FIG. 2 shows an example of lenselet image which is captured by plenoptic camera 150.
Figure 3:
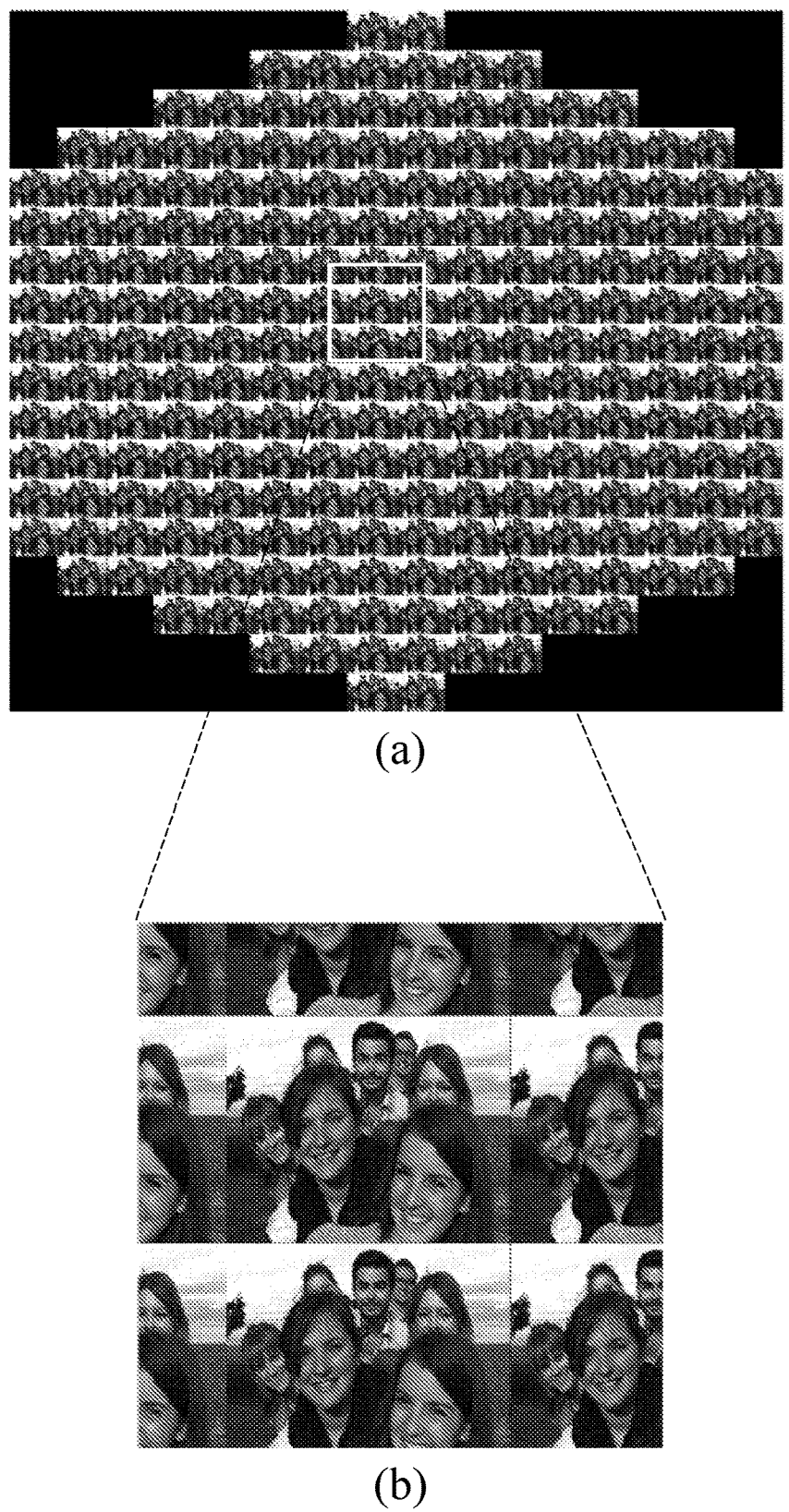
FIG. 3 shows an example of subaperture image which is composed by a set of sub-views.
Figure 4:
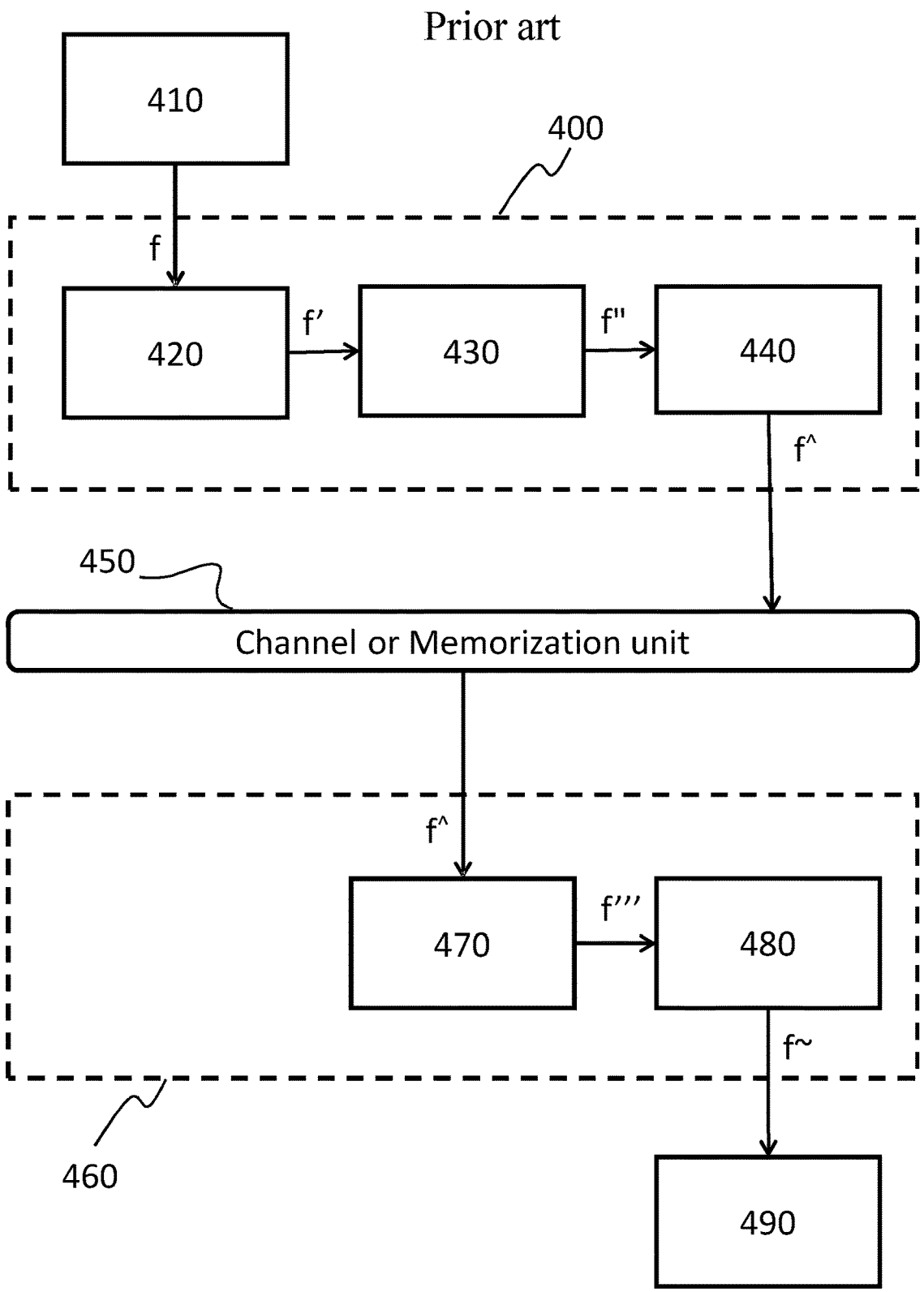
FIG. 4 illustrates a block diagram of light field image encoding-decoding system according to the state of art.
Figure 5:
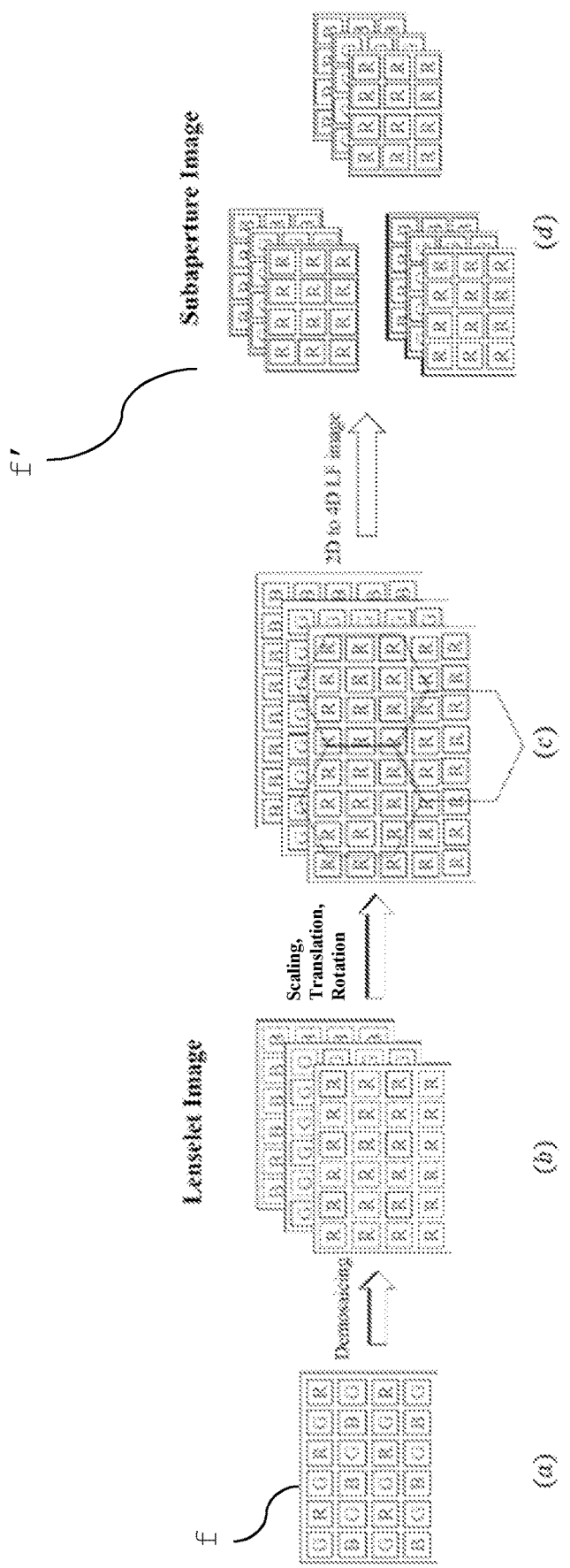
FIG. 5 illustrates the pre-processing operations for encoding light field images according to the state of art.
Figure 6:
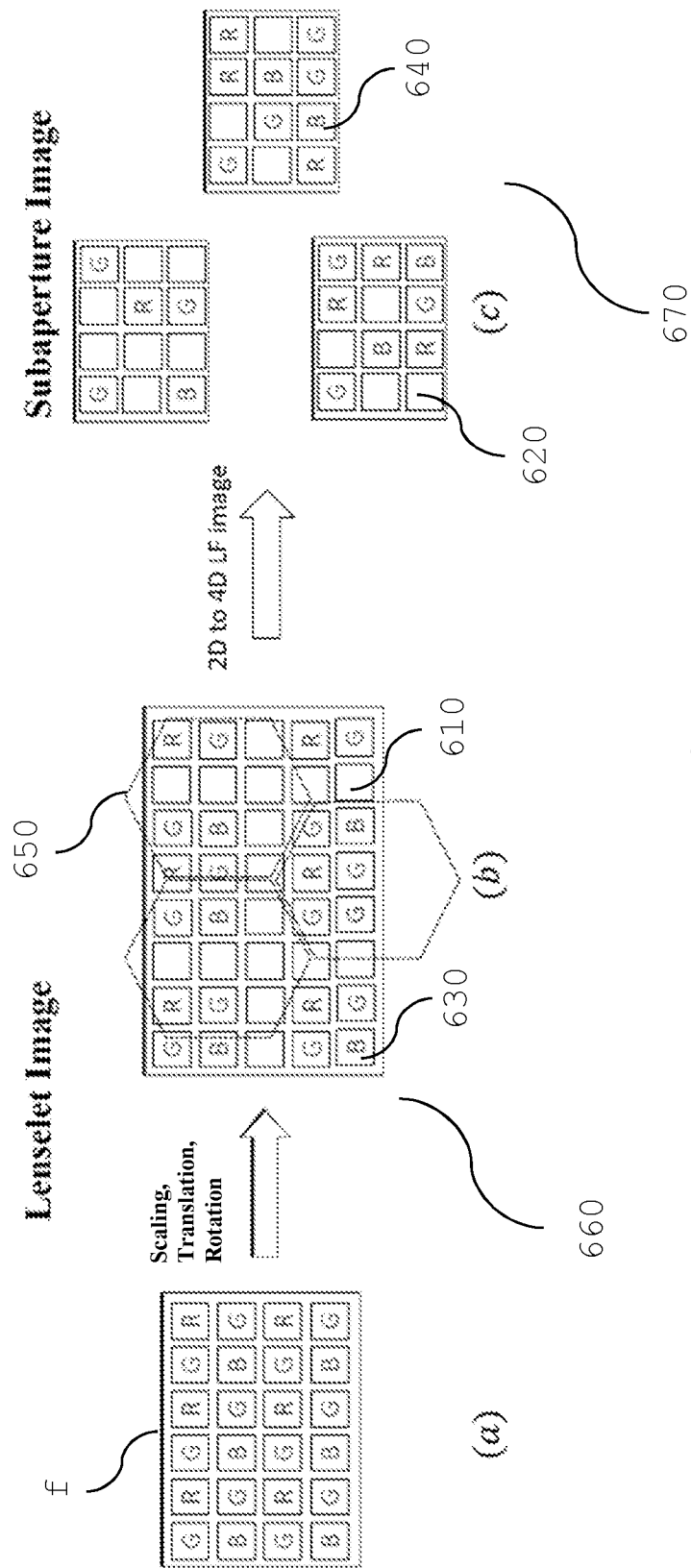
FIG. 6 illustrates the pre-processing operations for encoding light field images according to an embodiment of the present invention.
Figure 7:
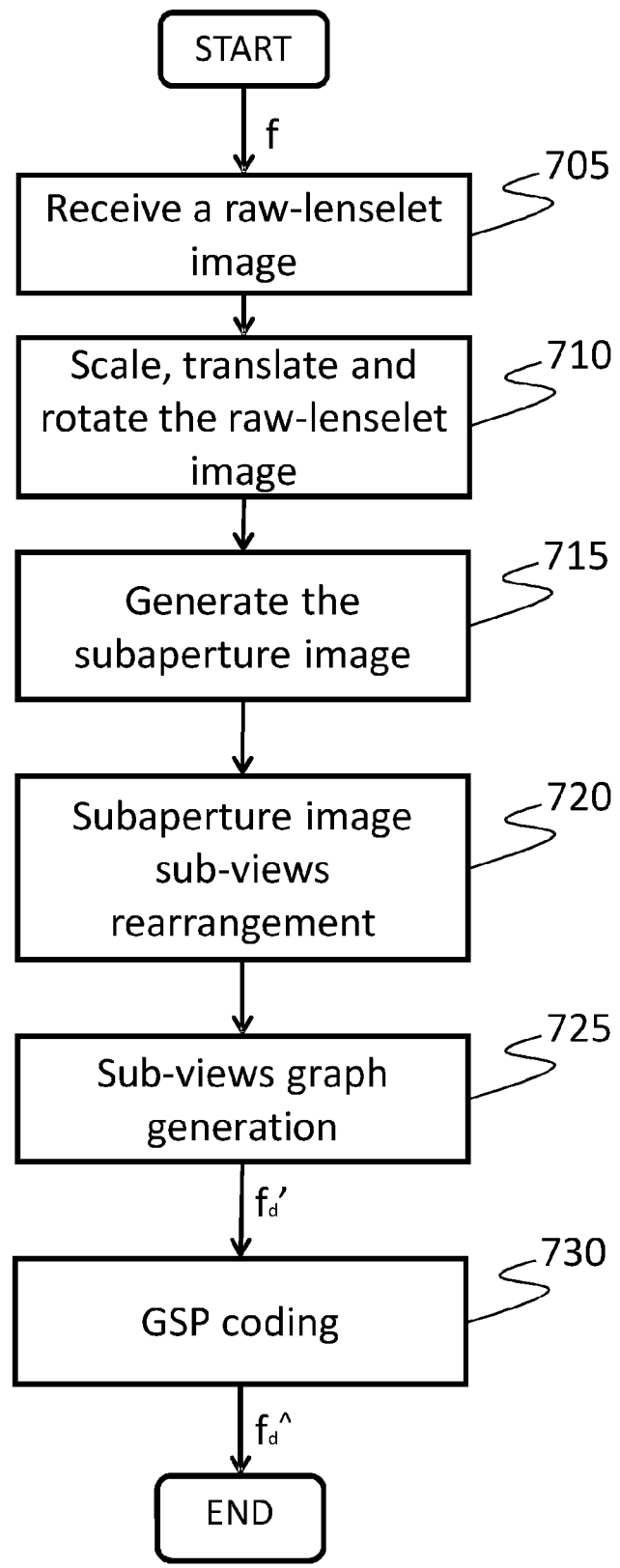
FIG. 7 shows the functioning of the pre-processing stage for encoding digital light field images according to an embodiment of the present invention.
Figure 13:
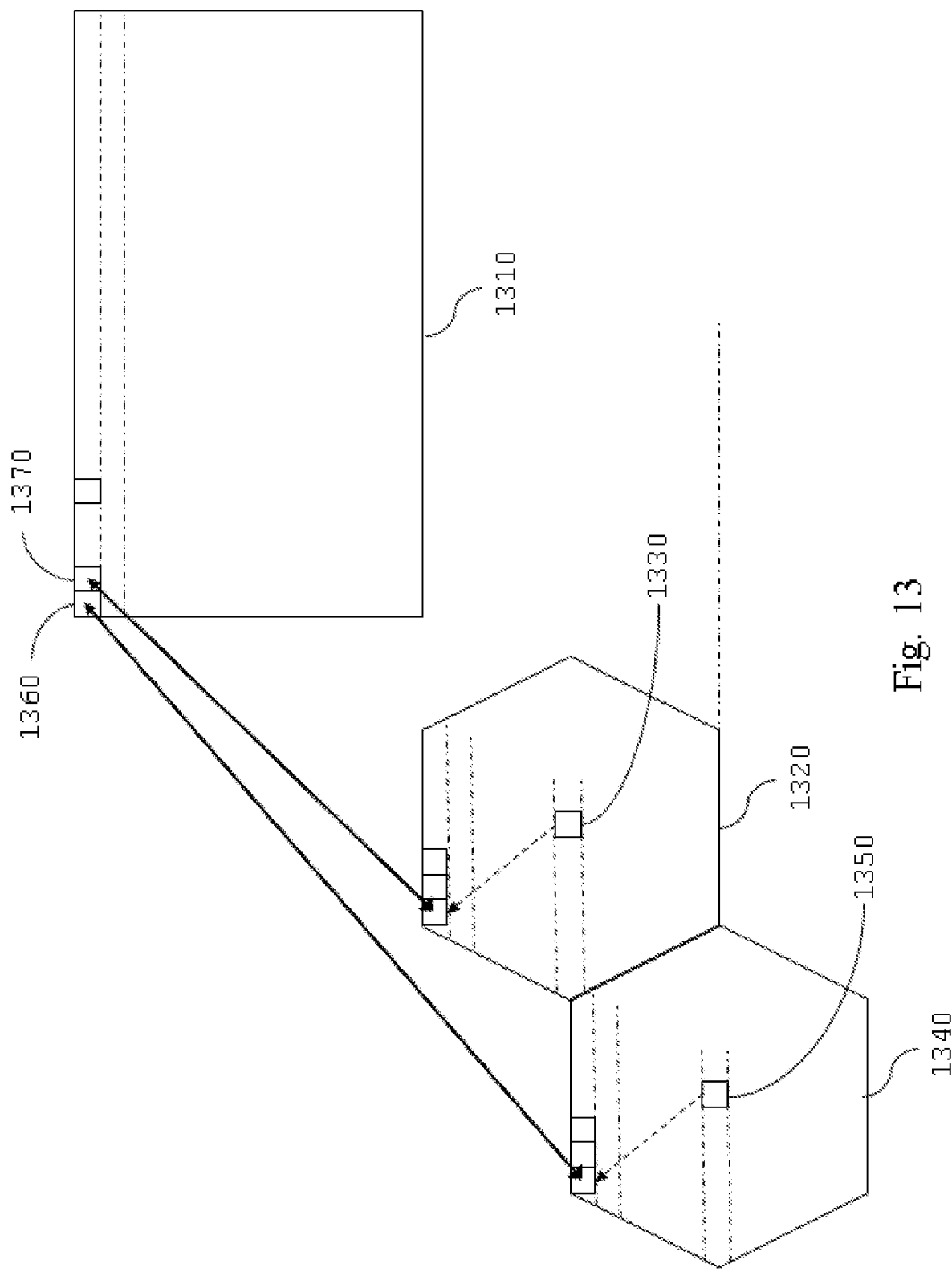
FIG. 13 illustrates the sub-view generating process from macro-pixels array and vice versa.
Figure 14:
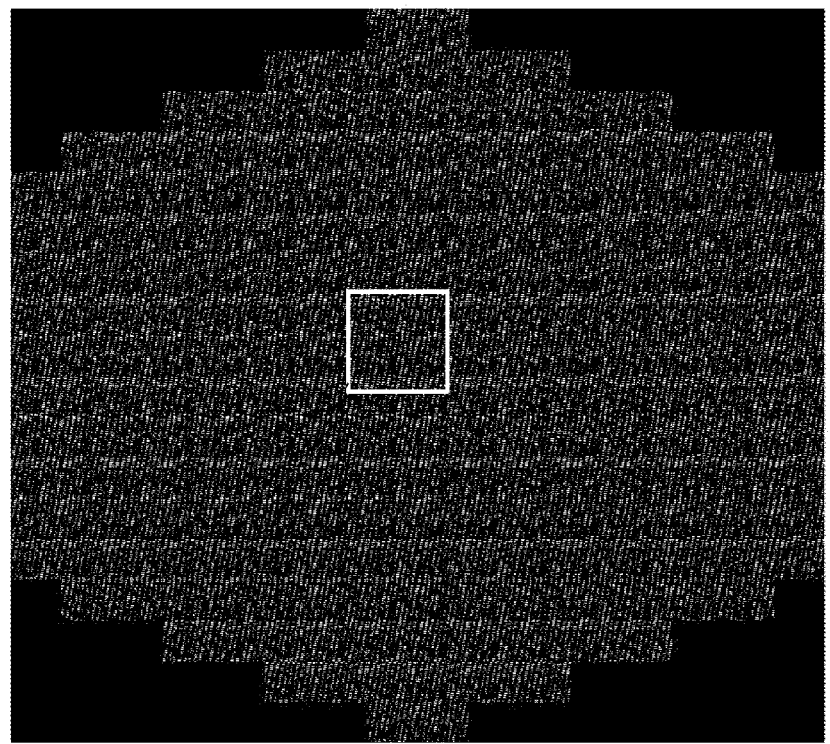
FIG. 14 shows an example of the green component of the generated subaperture image according to an embodiment of the present invention.
Figure 14:
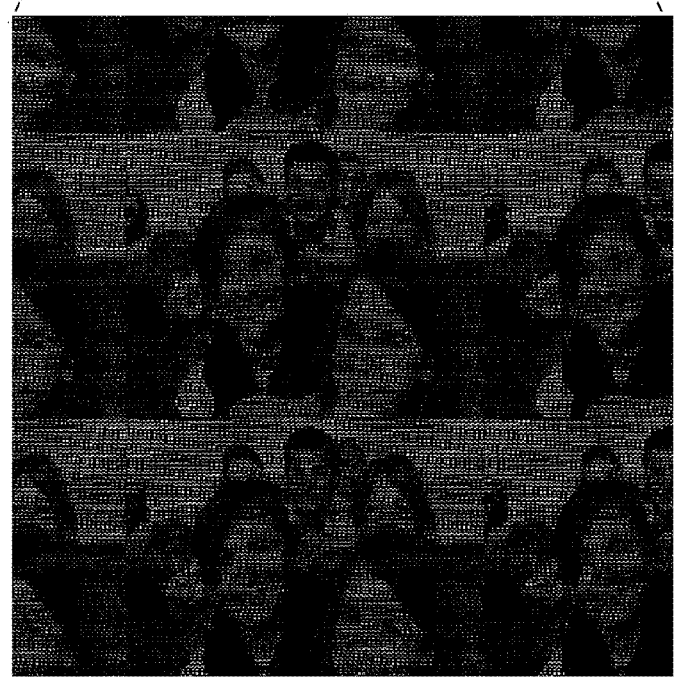
Figure 15:
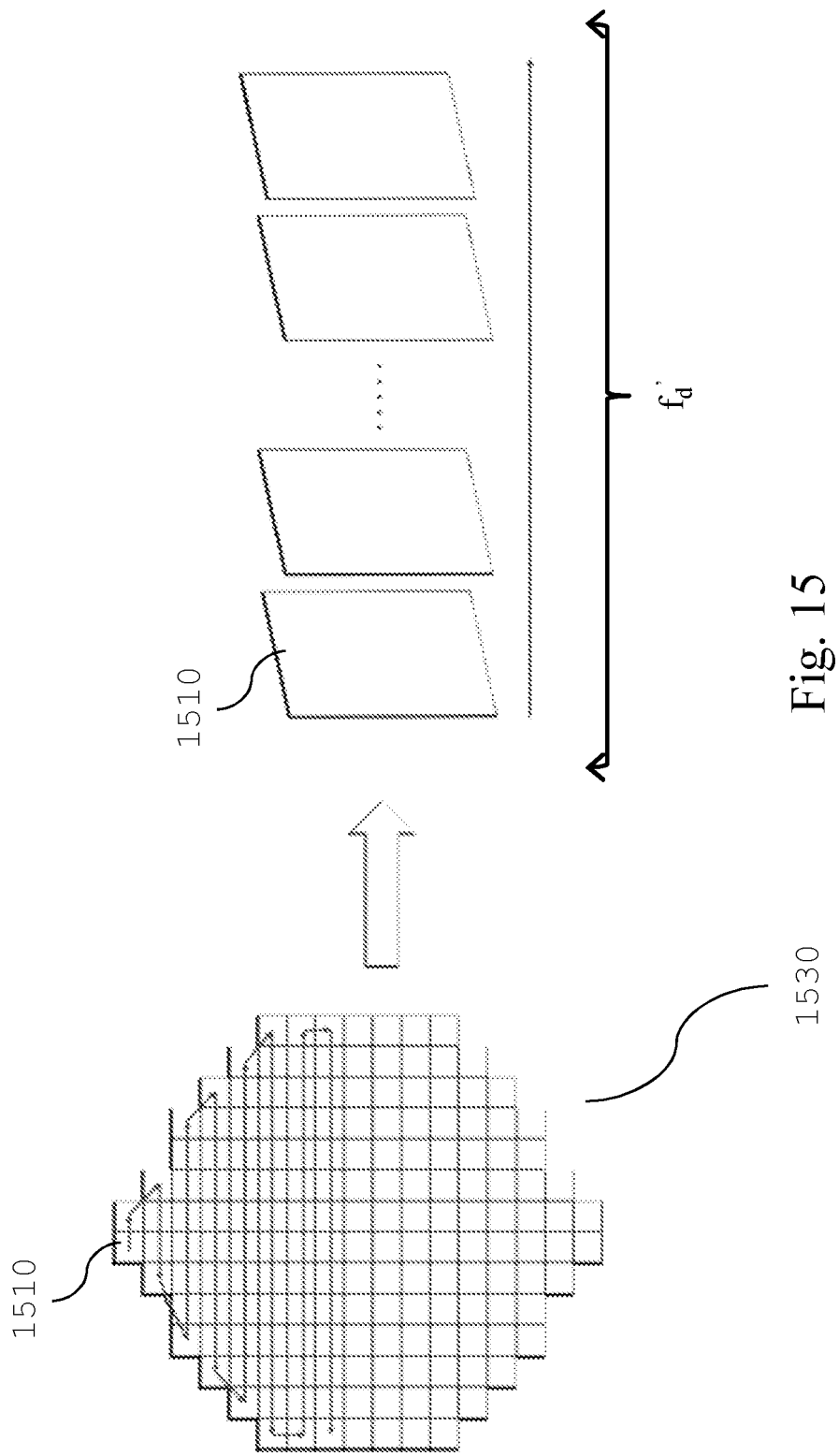
FIG. 15 pictures an exemplary raster-scanner rearrangement of the sub-views which compose the generated subaperture image.

With also reference to FIG. 6 and FIG. 7 the preprocessing unit 920 preferably comprises the following steps:
- a raw-lenslet image receiving step 705 for receiving a color patterned raw lenslet image f, see FIG. 6(a), which is generated by photosensor 410; no demosaicing of the raw image is performed before the subsequent operation;
- a transform step 710 for translating, rotating and scaling at least a portion of said raw lenslet image f obtained in the previous step; in particular, the pixels of the raw lenslet image f are spatially displaced (that can comprise scaling, and/or translations and/or rotations) in a new multi-color image having a larger number of columns and rows with respect to the received raw lenslet image, wherein dummy pixels e.g. 610, 620 are inserted in the pixel locations having undefined color channel value and wherein said displacement is performed so as to put the estimated center location of each macro-pixel 650 (denoted in dashed line, FIG. 6(b)) onto integer pixel locations. For example, this operation can be performed as described by D. G. Dansereau, O. Pizarro and S. B. Williams in "*Decoding, calibration and rectification for lenslet-based plenoptic cameras*", published in *Proceedings of the IEEE Conference on Computer Vision and Pattern Recognition* (2013);
- preferably: a subaperture generating step 715 for generating a subaperture image 670 from the transformed raw lenslet image, such that each sub-view comprising said subaperture image is composed by considering the same relative pixel position with respect to each macro-pixel center. FIG. 13 illustrates the sub-view generating process: the pixels 1360 and 1370, which compose a sub-view 1310, are taken from the macro-pixels 1320 and 1340 respectively, such that they have the same relative position with respect to their corresponding macro-pixels center 1330 and 1350 respectively. FIG. 14(a) shows an example of the green component of the generated subaperture image 670, while FIG. 14(b) is a detail of FIG. 14(a). It should be noted that due the presence of dummy pixels (e.g. 610, 620), the pixels which represent the image information (e.g. 630, 640) are irregularly spaced on the generated subaperture image 670, see FIG. 6(c) and FIG. 14(b), thus cannot be encoded by the traditional transform coding such as discrete cosine transform (DCT) or discrete wavelet transform (DWT), which are approached for example in HEVC standard. The irregular spacing is due to the missing demosaicing operation performed in the state of the art, which renders ineffective the traditional coding approaches. However, in order to encode the generated subaperture image, its graph representation and the related graph-based compression techniques can be used instead; in fact, the irregular spacing of the pixels generates discontinuities in the image, i.e. high frequency components which makes the traditional coding techniques inefficient with respect to the GSP techniques; in addition, an image with less pixel results in a simpler graph representation, that can be compressed more efficiently;
- preferably: a subaperture rearranging step 720 for rearranging in a sequence the sub-views composing the generated subaperture image 670, on the basis of at least one predefined order. FIG. 15 shows an exemplary raster-scanner rearrangement of the sub-views e.g. 1510 composing the generated subaperture image 1530, obtaining a sub-view sequence $f_d'$ in horizontal scan order;
- a sub-views graph generating step 725 for generating a graph representation of the sub-view images sequence in order to perform a graph based compression of said sub-view images sequence, i.e. any GSP technique.

Two distinctive schemes for graph connection can be considered.

The first scheme takes into account only intra-view connections when constructing a graph, where each node is connected to a predefined number K of nearest nodes in terms of Euclidean distance, i.e. the distance between available irregularly spaced pixels (e.g. 630, 640) within the same sub-view of the sequence.

The second scheme takes into account both intra and inter-view correlations among the sub-views of the sequence.

In order to reduce graph complexity, the sub-views sequence is divided into multiple GOPs consists of a predefined number G of sub-views.

Figure 16:
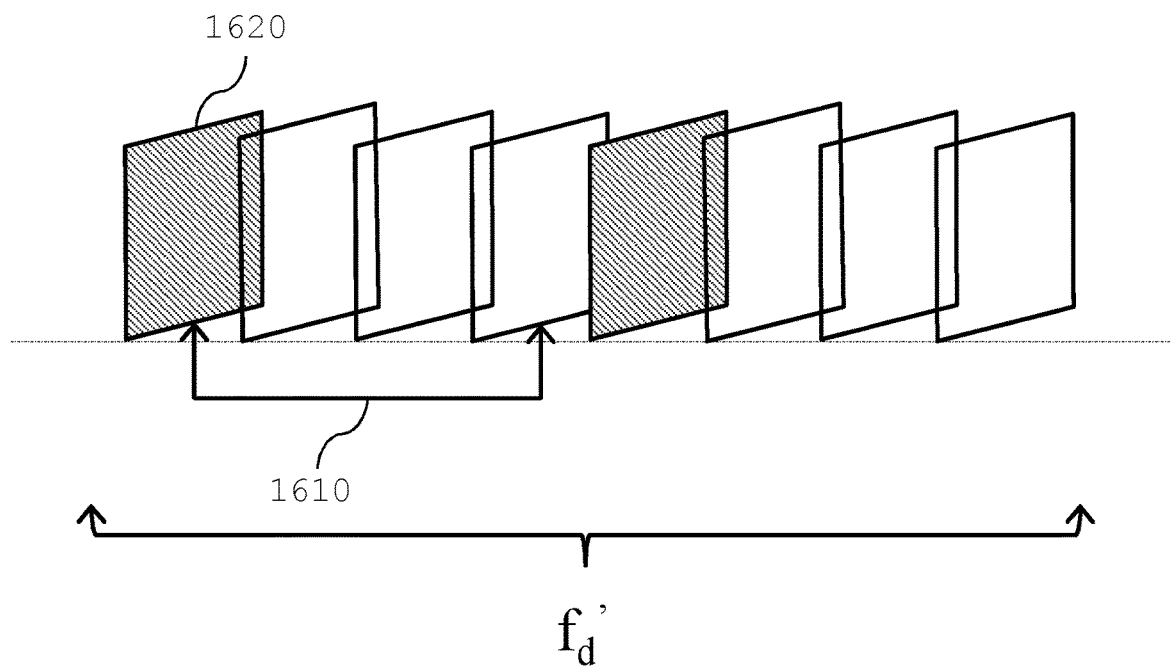
FIG. 16 illustrates an example of the sub-views sequence subdivided in terms of GOPs structure.

FIG. 16 shows an example of the sub-views sequence $f_d'$ subdivided in terms of GOPs structure 1610, which is composed by four sub-views comprising a reference sub-view 1620.

Successively, a sub-view matching for motion estimation between each sub-view and the previous reference sub-view is performed in the sequence.

The optimal global motion vector can be determined for each sub-view in terms of sum of squared error (SSE), which can be evaluated considering the pixel samples of each sub-view and the previous reference sub-view.

The matching is considered for the whole sub-view, instead of applying the block-based matching employed for example for the motion estimation in HEVC.

Specifically, each m×n sub-view is first extrapolated to the size of (m+2r)×(n+2r) before motion search, where r is the motion search width.

This reduces the overhead in encoding of the motion vectors. The sub-view extrapolation can be performed by employing several techniques, for example by copying the border pixel samples of each sub-view.

After motion estimation, each pixel is connected to a predefined number P of nearest neighbours in terms of Euclidean distance within the same sub-view and the reference view shifted by the optimal motion vector.

With also reference to FIG. 9 the graph coding unit 940 (and the decoding apparatus 1100 as well, for decoding) encodes the sub-views sequence using graph signal processing (GSP) techniques such as the Graph Fourier transform (GFT) or the Graph based Lifting Transform (GLT) for coding each GOP separately.

A graph G=(E,V) is composed of a set of nodes v∈V, connected with links. For each link $e_{i,j} \in E$, connecting nodes $v_i$ and $v_j$, there is an associated weight of non-negative value $w_{ij} \in [0,1]$, which captures the similarity between the connected nodes.

An image f can be represented as a graph where the pixels of the image correspond to the graph nodes, while the weights of the links describe the pixels similarity which can be evaluated using a predetermined non-linear function (e.g. Gaussian or Cauchy function) depending on the grayscale space distance $d_{i,j}=|f_i-f_j|$ between the i-th pixel $f_i$ and the j-th pixel $f_j$ of the image.

In the Graph Fourier transform (GFT) technique, the graph information can be represented with a weights matrix W which elements are the weights $w_{ij}$ of the graph, then the corresponding Laplacian matrix can be obtained as L=D-W where D is a diagonal matrix with elements $d_i = \Sigma_k w_{ik}$. The GFT is performed by the mathematical expression $\hat{f}=U^T f$ where U is the matrix which columns are the eigenvectors of the matrix L, and f is the raster-scanner vector representation of the image f.

The coefficients $\hat{f}$ and the weights $w_{ij}$ are then quantized and entropy coded. More related work known in the art describe approaches improving the GFT based coding, as shown for example by W. Hu, G. Cheung, A. Ortega, and O. C. Au in "*Multiresolution graph Fourier transform for compression of piecewise smooth images*", published in *IEEE Transactions on Image Processing*.

The Graph based Lifting Transform (GLT) technique is a multi-level filterbank that guarantees invertibility. At each level m, the graph nodes are first divided into two disjoint sets, a prediction set $SP^m$ and an update set $SU^m$.

The values in $SU^m$ are used to predict the values in $SP^m$, the resulting prediction errors are stored in $SP^m$, and are then used to update the values in $SU^m$.

The smoothed signal in $SU^m$ will serve as the input signal to level m+1, while the computation for coefficients in $SP^m$ uses only the information in $SU^m$, and vice versa.

Carrying on the process iteratively produces a multi-resolution decomposition. For video/image compression applications, the coefficients in the update set $SU^M$ of the highest-level M will be quantized and entropy coded. More related work known in the art describe approaches improving the GLT based coding, as shown for example by Y.-H. Chao, A. Ortega, and S. Yea, "*Graph-based lifting transform for intra-predicted video coding,*" published in 2016 *IEEE International Conference on Acoustics, Speech and Signal Processing* (ICASSP 2016).

Summarizing, with also reference to FIG. 9 and FIG. 10, the method for encoding digital images according to the invention comprises the following phases:

- a receiving phase, wherein at least a portion of a color patterned raw lenselet image f is received by means of the input unit 1070;
- a transform phase, wherein the color patterned raw lenselet image f is rotated, translated and scaled by the unit 920 in order to put, through the processing unit 1010, the estimated center location of each macro-pixel onto the integer pixel locations;
- preferably: a subaperture generating phase, wherein a subaperture image 670 is generated from the transformed raw lenselet image, by the unit 920 by composing each sub-view, through the processing unit 1010, such that the pixel having the same relative position with respect to each macro-pixel center is used;
- preferably: a subaperture rearranging phase, wherein a sequence of sub-views is generated by the unit 920 by rearranging through the processing unit 1010 the sub-views composing the generated sub aperture image, on the basis of at least one predefined order (for example the raster scan order as depicted in FIG. 15);
- preferably: a sub-views graph generating phase, wherein a graph representation of the sub-view images sequence is generated by the unit 920 by organizing said sub-views sequence in terms of GOP structures and by considering intra-view or inter-view correlations among the sub-views into the GOP structure through the processing unit 1010, such that each node of said graph representation is connected to a predefined number of nearest nodes in terms of Euclidean distance within the same sub-view and the reference sub-view into the GOP structure;
- a graph coding phase, wherein a bitstream $f_d\hat{}$ is generated by the unit 940 by encoding through the processing unit 1110, the graph representation of the sub-view images sequence according to a predefined graph signal processing (GSP) technique (step 730).

Finally, the graph-coded bitstream $f_d\hat{}$ of the sub-views sequence can be transmitted and/or stored by means of the output unit 1080.

Decoding

With reference to FIG. 8 and FIG. 9, the decoder 960 comprises the graph decoding unit 970, the demosaicing unit 975 and the post-processing unit 980.

The graph decoding unit 970 is configured to receive and decode the bitstream $f_d\hat{}$ of the sub-views sequence according to a predefined graph signal processing (GSP) techniques, outputting the reconstructed sub-views sequence $f_d''$ (step 805).

The demosaicing unit 975 preferably performs the following steps:

- a subaperture image reconstructing step 810 for receiving the reconstructed sub-views sequence $f_d''$ and to generate the reconstructed subaperture image $f_d'''$, rearranging each reconstructed sub-view in the sequence on the basis of at least one predefined order (see FIG. 15);
- a lenselet image reconstructing step 815 for receiving the reconstructed subaperture image $f_d'''$ and to generate the reconstructed lenselet image, in particular the pixels of each sub-view 1310 are located in the corresponding macro-pixels 1320, 1340 on the basis of their order, as pictured in FIG. 13;
- a demosaicing filter step 820 for receiving the reconstructed lenselet image and to apply a demosaicing algorithm in order to generate the full-color lenselet image through a RGB color interpolation;
- preferably: a subaperture image generating step 830 for receiving the transformed full-color lenselet image and to generate a full-color subaperture image $f_d'''$, such that each sub-view 1310 comprising said full-color subaperture image $f_d'''$ is composed by considering the same relative pixel position with respect to each macro-pixel center 1330, 1350 (see FIG. 13); this operation is performed on each color channel of the transformed full-color lenselet image.

The optional post-processing unit 980 is configured to receive the full-color subaperture image $f_d'''$ and to generate a reconstructed light field image $f_d^{\sim}$, using operations permitted in the light field images such as re-focusing, noise reduction, 3D view construction and modification of depth of field.

Summarizing, with also reference to FIG. 9 and FIG. 11, the method for decoding digital images or video streams according to the invention comprises the following phases:

a receiving phase, wherein the bitstream $f_d^{\wedge}$ of the sub-views sequence is received by means of the input unit 1180;

a graph decoding phase, wherein the bitstream $f_d^{\wedge}$ is decoded, by means of the processing unit 1110, according to a predefined graph signal processing (GSP) technique, outputting the reconstructed sub-views sequence $f_d''$;

preferably: a subaperture image reconstructing phase, wherein a reconstructed subaperture image $f_d'''$ is generated by means of the processing unit 1110, rearranging each reconstructed sub-view in the sequence, on the basis of at least one predefined order;

preferably: a lenselet image reconstructing phase, wherein a reconstructed lenselet image is generated by means of the processing unit 1110 such that, the pixels of each sub-view are located in the corresponding macro-pixels on the basis of the order used in the coding method;

a demosaicing filter phase, wherein a full-color lenselet image is generated by means of the processing unit 1110, through a RGB color interpolation by applying a demosaicing technique;

preferably: a subaperture image generating phase, wherein a full-color subaperture image $f_d'''$ is generated by means of the processing unit 1110, such that each sub-view comprising said full-color subaperture image $f_d'''$ is composed by considering the same relative pixel position respect each macro-pixel center for each color channel of said full-color lenselet image;

preferably: a post-processing phase, wherein a reconstructed light field image $f_d^{\sim}$ is generated by means of the processing unit 1110, by using operations allowed in the light field images such as re-focusing, noise reduction, 3D view construction and modification of depth of field starting from the full-color subaperture image $f_d'''$.

Finally, the reconstructed light field image $f_d^{\sim}$ can be outputted by means of output video unit 1170 and displayed on the display unit 1195.

Figure 17:
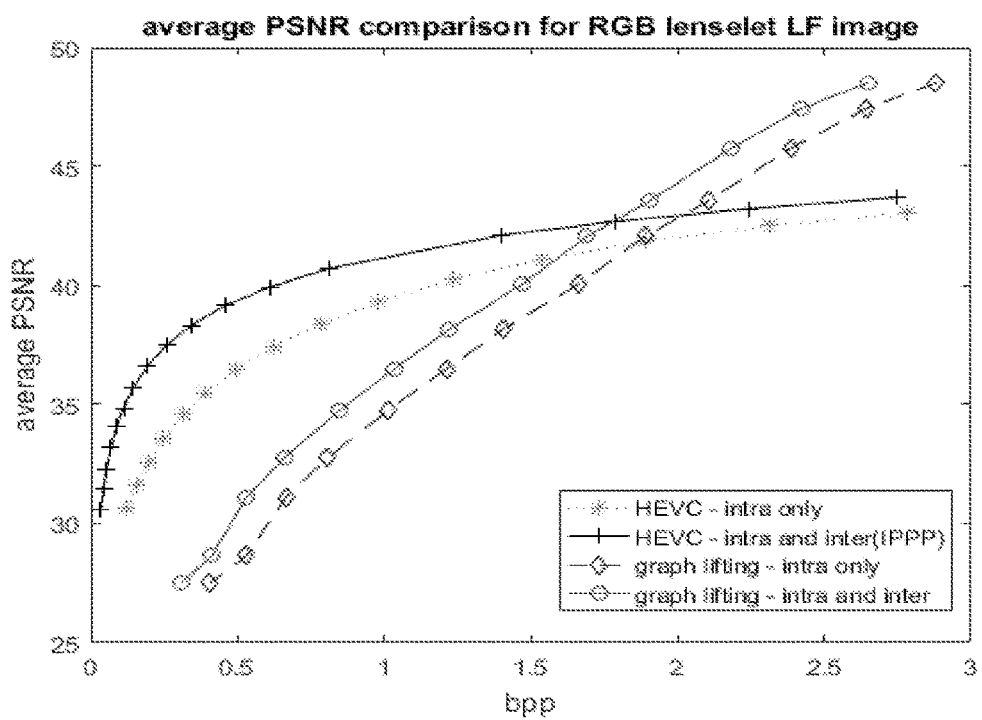
FIG. 17 shows the performance of a test encoder-decoder pair implemented according to an embodiment of the present invention.

With reference to FIG. 15, FIG. 16 and FIG. 17, the results of performance tests conducted by the inventors are going to be discussed. In this test, an encoder-decoder pair implemented according to an embodiment of the present invention has been evaluated.

In order to perform the coding-encoding test, the EPFL database (M. Rerabek and T. Ebrahimi, "New Light Field Image Dataset," in 8th International Conference on Quality of Multimedia Experience (QoMEX), no. EPFL-CONF-218363, 2016) was used.

The subaperture image consists of 193 sub-views of size 432×624. FIG. 17 shows the performance of the method described in an embodiment of the present invention, which is compared with the coding approach using HEVC standard.

The ordinate axis denotes the average PSNR for R, G, and B color components. Compared to state-of-the-art schemes, a coding gain is achieved at the high-bitrate region.

For the test, both All-intra and Low delay P configurations were used for the baseline HEVC based scheme.

For Low delay P configuration in HEVC. The sub-views are arranged into pseudo-sequence in the same way as pictured in FIG. 15, and divided into multiple size 4 GOPs (FIG. 16).

The first view in each GOP is compressed as an I-frame, and the remaining frames are coded as P-frames. For the proposed graph based approach, each node is connected to 6 nearest neighbours, and the search width r=2 for sub-view matching.

The transformed coefficients are uniformly quantized and entropy coded using the Alphabet and Group Partitioning (AGP) proposed by Said and Pearlman in "*A new, fast, and efficient image codec based on set partitioning in hierarchical trees,*" published in *IEEE Transactions on circuits and systems for video technology*, vol. 6, no. 3, pp. 243-250, 1996. In order to evaluate the reconstructed lenselet image, using graph based coding, the reconstructed lenselet image is demosaiced and converted to the colored subaperture image in a same way as proposed by D. G. Dansereau, O. Pizarro, and S. B. Williams, in "*Decoding, calibration and rectification for lenselet-based plenoptic cameras*", published in *Proceedings of the IEEE Conference on Computer Vision and Pattern Recognition*, 2013.

In the baseline method, the reconstructed YUV 4:2:0 sequences are converted to RGB 4:4:4, where the upsampling for U and V components is based on nearest neighbour. Concluding, the obtained results show that the method described in the present invention can outperform the state-of-the-art schemes like a HEVC-based approach.

In an alternative embodiment of the invention, the patterned raw lenselet image f can be generated by employing other color filter arrays placed on a square grid of photosensors, besides the well-known Bayer filter.

In another embodiment of the invention, the patterned raw lenselet image f can be generated by capturing other combinations of color components, for example RGBY (red, green, blue, yellow) instead of RGB.

In other embodiments, the invention is integrated in a video coding technique wherein also the temporal correlation between different light field images is taken into account. To that end, a prediction mechanism similar to those used in the conventional video compression standards can be used in combination with the invention for effectively compressing and decompressing a video signal.

In other embodiments, the encoding and decoding stages described in the present invention can be performed employing other graph signal processing (GSP) techniques instead of the Graph Fourier transform (GFT), or the Graph based Lifting Transform (GLT).

In other embodiments, the graph signal processing (GSP) technique employed at the encoding and decoding stages can be signalled from the encoder apparatus to the decoder apparatus. Alternatively, the GSP technique employed by both the encoder and decoder is defined in a technical standard.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. A method for encoding a raw lenselet image (f), comprising:
   a receiving phase, wherein at least a portion of a raw lenselet image (f) is received, said image (f) comprising a plurality of macro-pixels, each macro-pixel comprising pixels corresponding to a specific view angle for the same point of a scene;
   an output phase, wherein a bitstream ($f_d\hat{}$) comprising at least a portion of an encoded lenselet image (f) is outputted;
   an image transform phase, wherein the pixels of said raw lenselet image (f) are spatially displaced in a transformed multi-color image that includes the colors red, blue and green and has a larger number of columns and rows with respect to the received raw lenselet image, wherein dummy pixels having undefined value are inserted into said raw lenselet image (f) and wherein said displacement is performed so as to put the estimated center location of each macro-pixel onto integer pixel locations;
   a sub-view generation phase, wherein a sequence of sub-views ($f_d'$) is generated, said sub-views comprising pixels of the same angular coordinates extracted from different macro-pixels of said transformed raw lenselet image (f);
   a graph coding phase, wherein a bitstream ($f_d\hat{}$) is generated by encoding a graph representation of at least one of the sub-views of said sequence ($f_d'$) according to a predefined graph signal processing (GSP) technique,
   wherein said output phase comprises outputting said graph-coded bitstream ($f_d\hat{}$) for its transmission or storage.

2. The encoding method according to claim 1, wherein said spatially displacement comprises at least a rotation or a translation or scaling operation.

3. The encoding method according to claim 1, wherein said graph representation is generated basing on said sequence ($f_d'$) of a plurality of said sub-views organized in group of pictures (GOP) structures.

4. The encoding method according to claim 1, wherein in said sub-views graph generating phase the sub-views sequence ($f_d'$) is divided into multiple GOP consists of a predefined number G of sub-views.

5. The encoding method according to claim 3, wherein said representation of the sub-views sequence ($f_d'$) is generated by considering intra-view or inter-view correlations among the sub-views into the group of pictures (GOP) structure such that each node of said graph representation is connected to a predefined number of nearest nodes in terms of Euclidean distance within the same sub-view and the reference sub-view into the GOP structure.

6. The encoding method according to claim 1, wherein said sub-view generation phase comprises:
   a subaperture generating phase, wherein a subaperture image comprising a plurality of sub-views is generated, by composing each sub-view such that the pixel having the same relative position with respect to each macro-pixel center is used;
   a subaperture rearranging phase, wherein a sequence ($f_d'$) of sub-views is generated by rearranging the sub-views composing the generated subaperture image, on the basis of at least one predefined order.

7. The encoding method according to claim 6, wherein in said subaperture rearranging phase said predefined order is a raster scan order, or a helicoidal order, or a zig-zag order or a chess-like order.

8. The encoding method according to claim 1, wherein in said graph coding phase said bitstream ($f_d\hat{}$) is generated by encoding said graph representation of the sub-views sequence ($f_d'$) according to the Graph Fourier transform (GFT) or the Graph based Lifting Transform (GLT).

9. A method for decoding a bitstream comprising at least one encoded raw lenselet image (f), comprising:
   a receiving phase, wherein a graph-coded bitstream ($f_d\hat{}$) of a sub-views sequence ($f_d'$) is received, wherein dummy pixels having undefined value are inserted into said raw lenselet image (f) and wherein each sub-view comprises pixels of the same angular coordinates extracted from different macro-pixels of said raw lenselet image (f), each macro-pixel comprising pixels corresponding to a specific view angle for the same point of a scene;
   an output phase, wherein the reconstructed light field image ($f_d\hat{}$) is outputted or displayed;
   a graph decoding phase, wherein said graph-coded bitstream ($f_d\hat{}$) is decoded according to a predefined graph signal processing (GSP) technique, outputting a reconstructed sub-views sequence ($f_d''$), wherein said sub-views comprise dummy pixels situated in pixel locations having undefined color value;
   a demosaicing filter phase, wherein a full-color demosaiced lenselet image that includes the colors red, blue and green is generated through a color interpolation by applying a demosaicing technique to said sub-views sequence ($f_d'$);
   a raw lenselet rearrangement phase, wherein a full-color subaperture image ($f_d'''$) that includes the colors red, blue and green is obtained basing on said demosaiced full-color lenselet image;
   wherein said output phase comprises outputting said generated full-color subaperture image ($f_d'''$).

10. The decoding method according to claim 9, wherein said lenselet rearrangement phase comprises
    an image reconstructing phase wherein a reconstructed subaperture image comprising a plurality of sub-views is generated rearranging said reconstructed sub-view in the sequence ($f_d''$) on the basis of at least one predefined order;
    a lenselet image reconstructing phase, wherein a reconstructed lenselet image is generated such that the pixels of each sub-view are located in the corresponding macro-pixels on the basis of the order used in the encoding of the received raw lenselet image (f).

11. The decoding method according to claim 9, wherein in said lenselet rearrangement phase said predefined order is a raster scan order, or a helicoidal order, or a zig-zag order or a chess-like order.

12. The decoding method according claim 9, wherein in said graph decoding phase said reconstructed sub-views sequence ($f_d''$) is generated by decoding said graph representation of the sub-views sequence ($f_d''$) according to the Graph Fourier transform (GFT) or the Graph based Lifting Transform (GLT).

13. An apparatus for encoding a raw lenselet image (f), comprising:
    an input unit configured for acquiring at least a portion of a raw lenselet image (f) from a source, comprising a plurality of macro-pixels, each macro-pixel comprising pixels corresponding to a specific view angle for the same point of a scene;
    an output unit configured for outputting at least a portion of a resulting bitstream ($f_d\hat{}$);

at least one processing unit configured for executing a set of instructions for encoding said raw lenselet image (f);

a memory unit containing image data relating to said a raw lenselet image (f) and the result ($f_d'$, $f_d\hat{}$) of the execution of said encoding instructions, wherein said at least one processing unit is configured for spatially displacing the pixels of said raw lenselet image (f) in a new multi-color image that includes the colors red, blue and green and has a larger number of columns and rows with respect to the received raw lenselet image, wherein dummy pixels are inserted in the pixel locations having undefined color channel value and wherein said displacement is performed so as to put the estimated center location of each macro-pixel onto integer pixel locations;

wherein said at least one processing unit is further configured for generating a graph representation of a sequence of sub-views ($f_d'$) starting from said raw lenselet image (f), each sub-view comprising pixels of the same angular coordinates extracted from different macro-pixels of said raw lenselet image (f);

wherein said at least one processing unit is further configured for fetching the graph representation of the sequence of sub-views ($f_d'$) from said memory unit, and for executing a graph signal processing (GSP) technique for coding said sequence of sub-views ($f_d'$), and storing the resulting bitstream ($f_d\hat{}$) into said memory unit.

14. The encoding apparatus according to claim 13, wherein said at least one processing unit is further configured for:

generating said sequence of sub-views ($f_d'$) by forming a subaperture image comprising a plurality of sub-views by composing each sub-view such that the pixel having the same relative position with respect to each macro-pixel center is used, and rearranging said sequence ($f_d'$) of sub-views composing the generated subaperture image on the basis of at least one predefined order.

15. The encoding apparatus according to claim 14, wherein said predefined order is a raster scan order, or a helicoidal order, or a zig-zag order, or a chess-like order.

16. The encoding apparatus according to claim 13, wherein said graph signal processing (GSP) technique is the Graph Fourier transform (GFT) or the Graph based Lifting Transform (GLT).

17. An apparatus for decoding an encoded raw lenselet image comprising:

an input unit configured to read a graph-coded bitstream ($f_d\hat{}$) of a sub-views sequence ($f_d'$), wherein dummy pixels having undefined value are inserted into said raw lenselet image (f) and wherein each sub-view comprises pixels of the same angular coordinates extracted from different macro-pixels of said raw lenselet image (f), each macro-pixel comprising pixels corresponding to a specific view angle for the same point of a scene ($f_d\hat{}$) from a communication channel or storage media, an output unit which reproduces or outputs the processed light field images or video streams ($f_d\tilde{}$);

at least one processing unit configured for executing a set of instruction for decoding said encoded images or video streams ($f_d\hat{}$);

a memory unit containing image data relating to said encoded images or video streams ($f_d\hat{}$) and the result of the execution of said instructions for decoding;

said at least one processing unit being configured for receiving and decoding the bitstream of the sub-views sequence ($f_d''$) according to a predefined graph signal processing (GSP) technique, such that a reconstructed sub-views sequence ($f_d''$) is recovered, wherein said sub-views comprise dummy pixels situated in pixel locations having undefined color value;

said at least one processing unit being configured for receiving said reconstructed sub-views sequence ($f_d''$) and to generate a full-color demosaiced lenselet image that includes the colors red, blue and green through a color interpolation by applying a demosaicing technique to said sub-views.

18. The decoding apparatus according to claim 17, wherein said at least one processing unit is configured for:

rearranging said sub-views on the basis of at least one predefined order for obtaining a reconstructed subaperture image ($f_d'''$) comprising a plurality of sub-views, and;

reconstructing a lenselet image such that the pixels of each sub-view are located in the corresponding macro-pixels on the basis of the order used in the encoding of the received raw lenselet image (f).

19. A non-transitory computer readable medium operable with a digital processing device, and which comprises portions of software code for executing the method according to claim 1.

* * * * *